United States Patent [19]

Nagashima et al.

[11] Patent Number: 4,791,492
[45] Date of Patent: Dec. 13, 1988

[54] IMAGE PROCESSING SYSTEM

[75] Inventors: Nao Nagashima, Yokohama; Kiyohisa Sugishima, Tokyo; Masanori Yamada, Kawasaki, all of Japan

[73] Assignee: Canon Kabushiki Kaisha, Tokyo, Japan

[21] Appl. No.: 598,192

[22] Filed: Apr. 9, 1984

[30] Foreign Application Priority Data

Apr. 12, 1983 [JP] Japan .................................. 58-63851
Apr. 12, 1983 [JP] Japan .................................. 58-63852
Aug. 18, 1983 [JP] Japan ................................ 58-151026

[51] Int. Cl.⁴ ...................... H04M 1/00; H04M 1/32; H04M 1/36
[52] U.S. Cl. ................... 358/256; 358/257; 358/264; 358/280
[58] Field of Search ............... 358/286, 257, 280, 264, 358/3 SH; 355/14 E, 14 D, 8

[56] References Cited

U.S. PATENT DOCUMENTS

| 4,106,060 | 8/1978 | Chapman, Jr. | 358/256 |
| 4,110,794 | 3/1978 | Lester et al. | 358/256 |
| 4,383,277 | 5/1983 | Kubo | 358/256 |
| 4,476,486 | 10/1984 | Ayata et al. | 358/78 |
| 4,491,873 | 1/1988 | Takayama | 358/256 |

FOREIGN PATENT DOCUMENTS 57-152764 9/1982 Japan .................................. 358/256

Primary Examiner—Edward L. Coles, Sr.
Attorney, Agent, or Firm—Fitzpatrick, Cella, Harper & Scinto

[57] ABSTRACT

There is described an image processing system in which the image signals from a reader unit is transmitted to plural image forming units for reproducing plural images simultaneously, through a signal transmitting unit. The signal transmitting unit has a function of synchronizing each image forming unit independently, in order to avoid the total failure or retarded operation caused by a failure in synchronization of one of the plural image forming units.

30 Claims, 29 Drawing Sheets

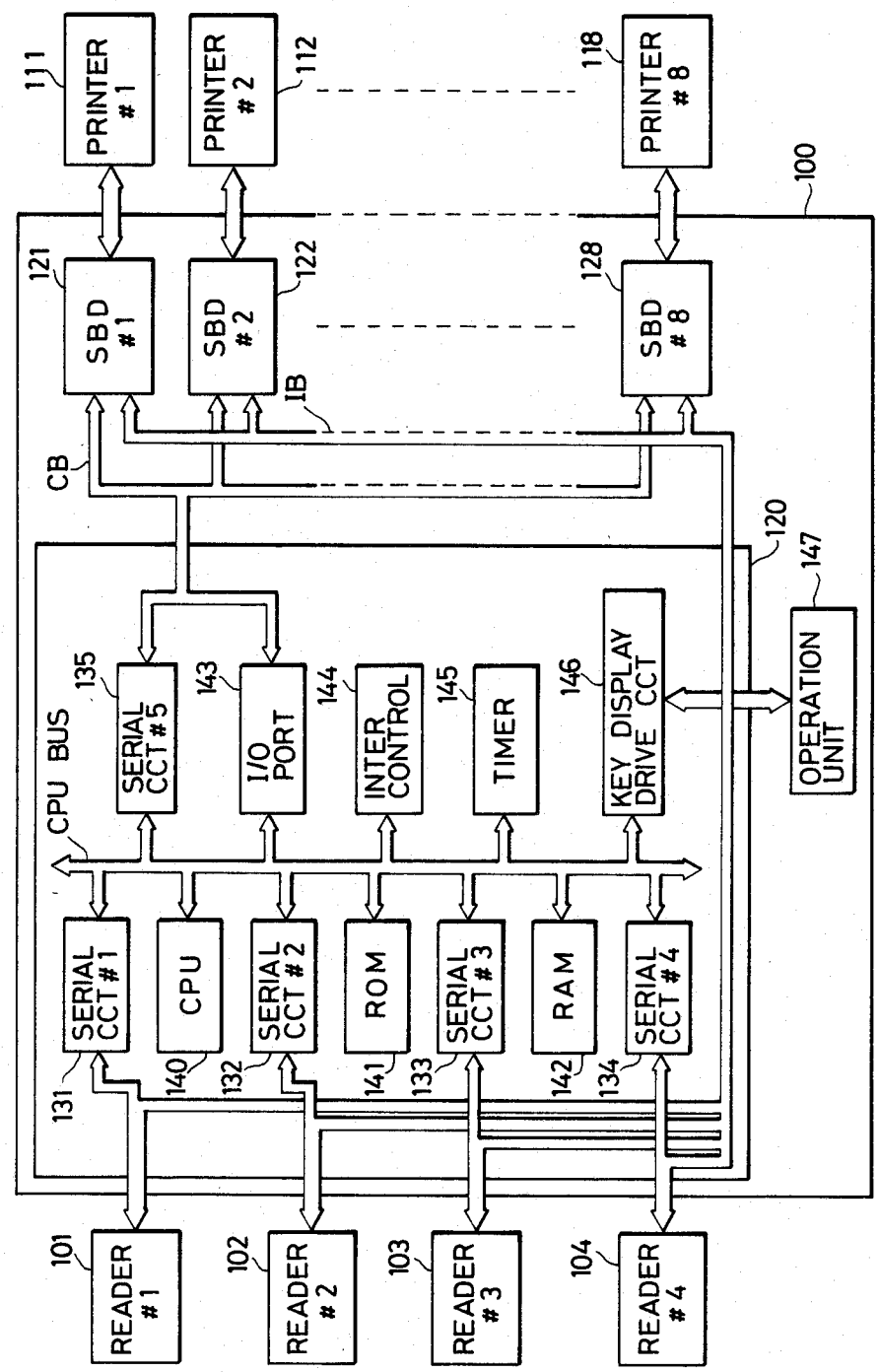

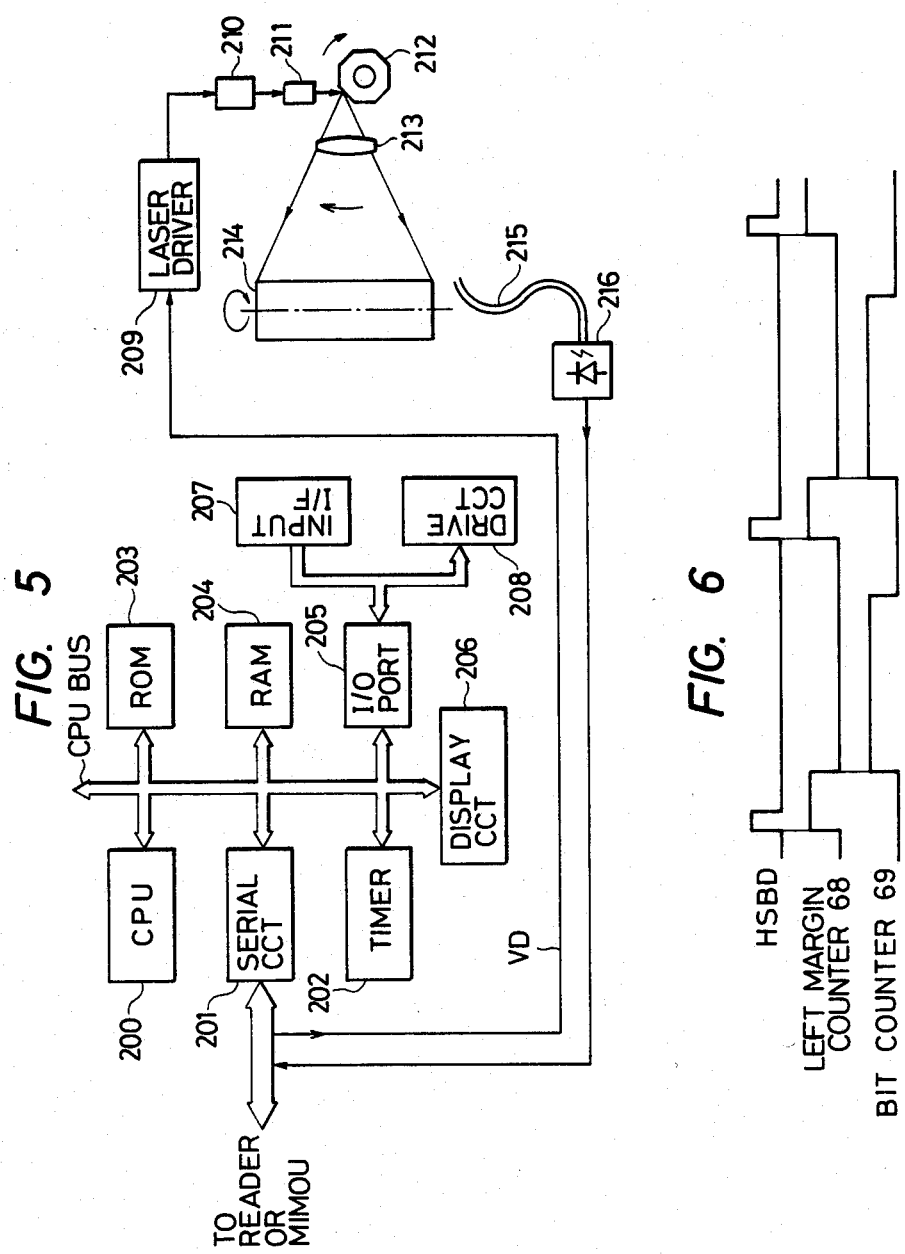

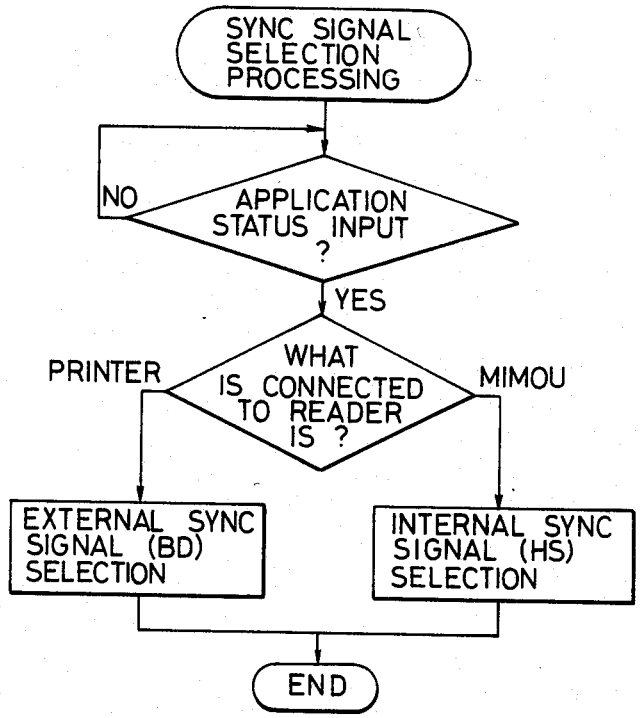

FIG. 10(b)

| | | | | | | |
|---|---|---|---|---|---|---|
| (8) | A3? | A4? | A4R? | | ETC | CLR |
| | ⌐SK1 | ⌐SK2 | ⌐SK3 | ⌐SK4 | ⌐SK5 | ⌐SK6 |
| (9) | A3? | A4!! | A4R? | | ECT | CLR |

(10) "PRINTER NUMBER SELECT"

| | | | | | | |
|---|---|---|---|---|---|---|
| (11) | ALL? | #1? | #2? | SORT? | OK | CLR |
| (12) | ALL? | #1? | #2!! | SORT? | OK | CLR |
| (13) | ALL? | #1? | #3? | SORT? | OK | CLR |
| (14) | ALL!! | #1? | #3? | SORT? | OK | CLR |
| (15) | ALL? | #1? | #3? | SORT!! | OK | CLR |
| (16) | MULTI!! | | LINE!! | | POSI!! | ETC |

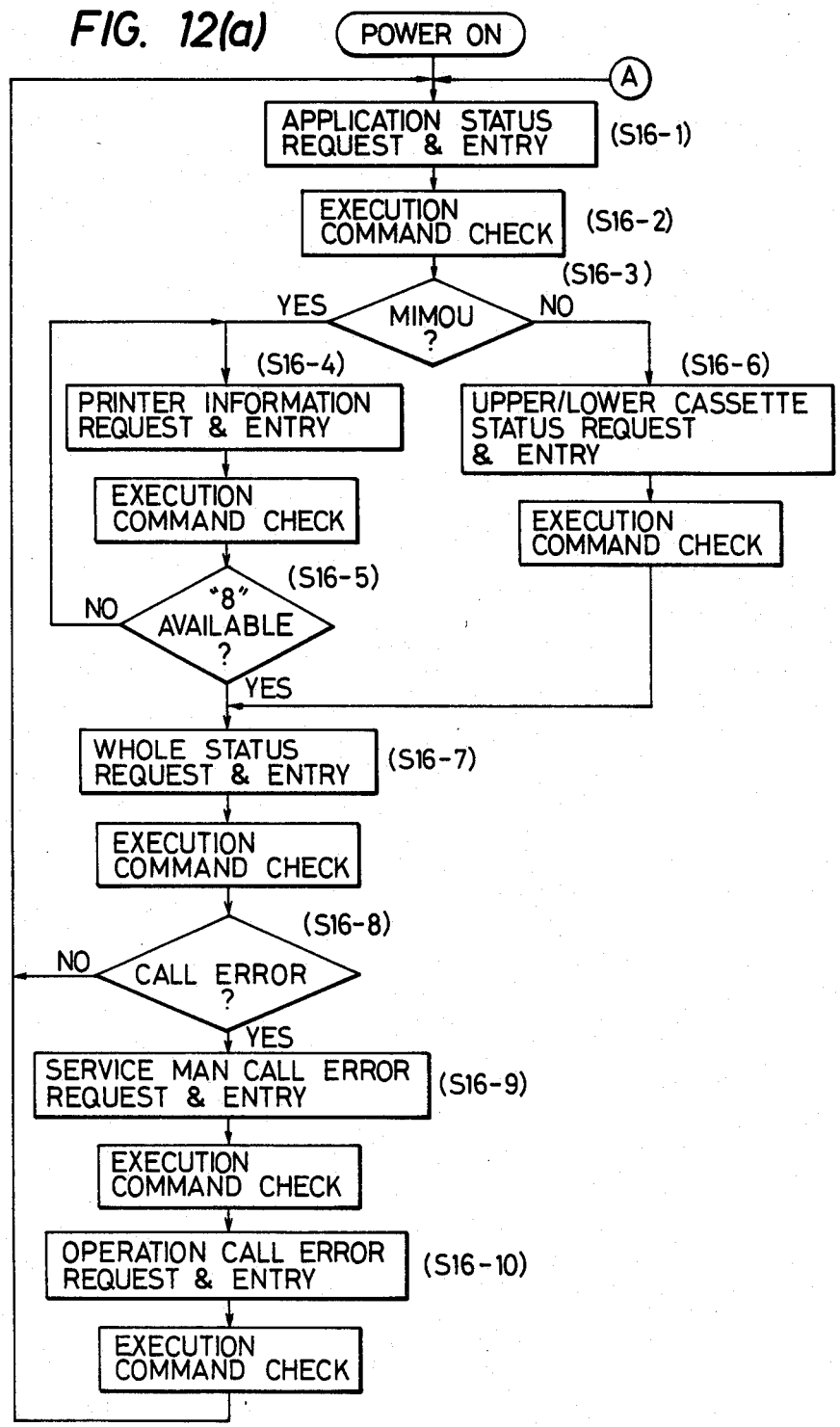

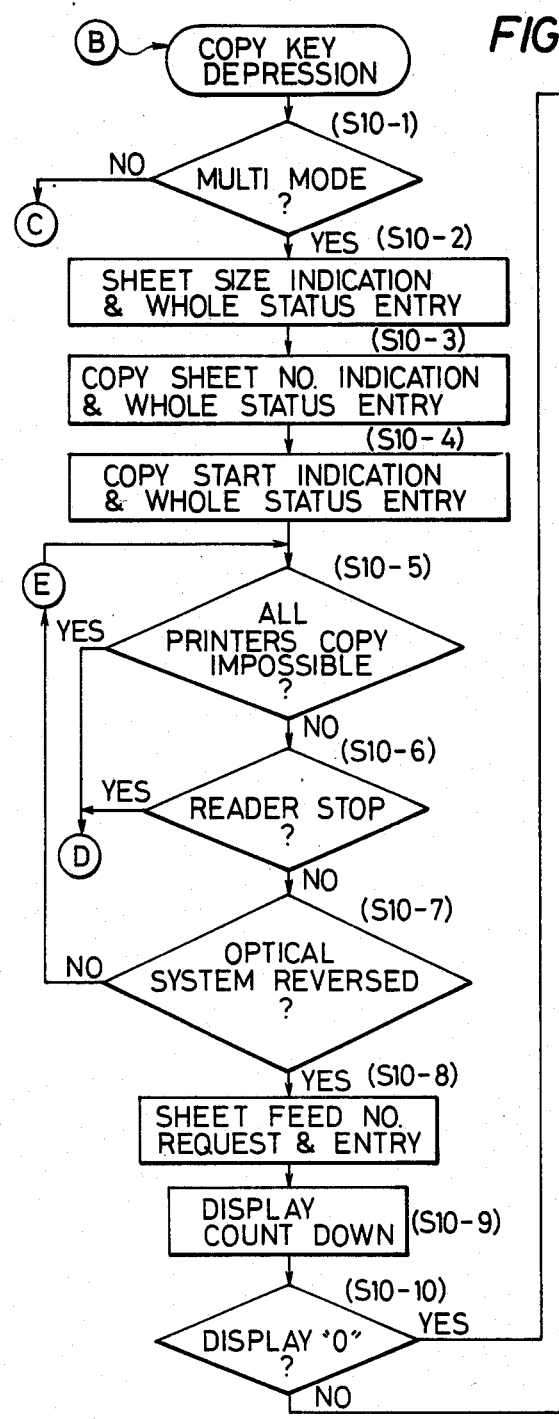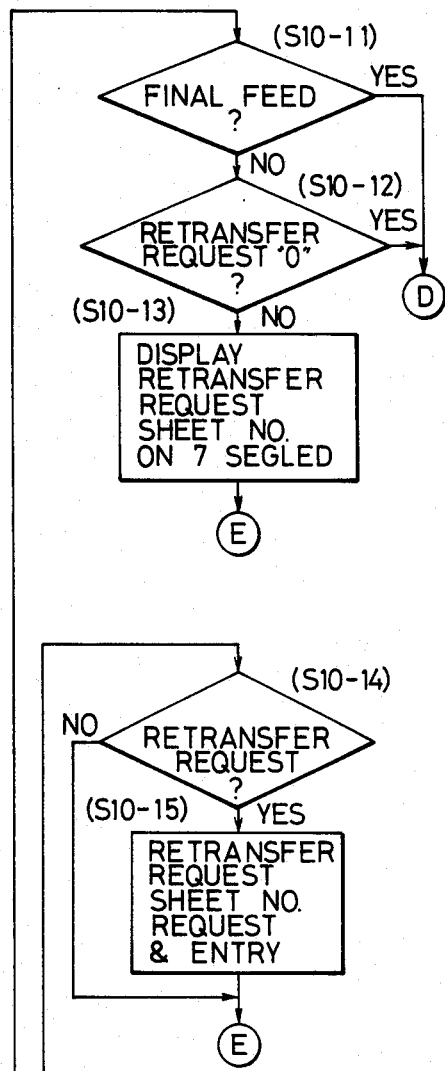
FIG. 13(a)

IMAGE PROCESSING SYSTEM

BACKGROUND OF THE INVENTION

1. Field of the Invention

The present invention relates to an image processing system, and more particularly to an image processing system capable of image forming operation in response to image signals supplied from an original reading device or the like.

2. Description of the Pior Art

There is already proposed an image process in which an image is formed on a recording material by image signals for example obtained by photoelectrically reading an original document with a reader unit.

Such an imaging process has advantages not achievable in the conventional electrostatic copiers, such as permitting the transmission of the original image to a distant location, the storage of the original image in a digital memory or the editing of the original image, since the image information is processed in the form of digital signals. However such digital copying system, if designed for a high resolving power, cannot easily achieve high-speed copying since a very high transfer rate is required for the digital signals, and will become extremely expensive even if such high speed can be technically combined with the high resolving power.

Also in a digital copier in which an image reader for reading the original image is combined with an electrostatic recording unit or printer utilizing a laser beam and a polygon scanner, the synchronization between the reader and the printer is achieved by sending synchronization signals which are synchronized with the rotation of the polygon scanner in the printer unit and controlling the image reading operation of the reader in response to said signals, thereby minimizing the memory capacity required for synchronization.

Such system is associated with a drawback that the image reading operation of the reader is inevitably affected in the case of an abnormality in the synchronization signals generated by the printer.

In the case of connecting plural printers to a reader unit, the reader is synchronized with a particular printer through the transfer of synchronization signals therebetween, and other printers are rendered simultaneously operable by the addition of synchronization memories for signal synchronization.

Such system is however defective in that the image reading operation of the reader is affected in the case of a failure in said particular printer supplying the synchronization signals to said reader, thus further affecting the image forming operations in the remaining normal printers and eventually leading to the failure of the entire system.

Also in a digital image processing system equipped with a reader for reading an original image to generate digital image signals, such reader may be connected with various apparatus, such as a printer for forming an image from digital image signals, a high-capacity memory for example an optical disk memory, a multi-input multi-output apparatus equipped with plural readers, plural printers and a magnetic disk, or a communication control unit for controlling communication lines such as a local network. In such case the use of an exclusive reader or a separate synchronizing unit has been indispensable because the synchronization signals to be used for deriving the digital image signals from the reader vary from apparatus to apparatus to be connected. Also it has been difficult to supply the image signals simultaneously to plural apparatus.

Though there have been proposed various imaging processes for image formation in response to image signals obtained by photoelectrically reading an original, such processes are mostly based on 1-to-1 combination of an image signal output unit and an image forming unit. Simultaneous plural image formations by image signals supplied from an output unit are theoretically possible, but such object cannot be achieved through mere electrical connections and requires adequate control and display. However such system will still be unsatisfactory for the operator if complicated operations are required.

SUMMARY OF THE INVENTION

In consideration of the foregoing, an object of the present invention is to provide an image processing system allowing easy modification of the system structure, such as expansion or reduction of the system.

Another object of the present invention is to enable high-speed copying by simultaneous function of plural image forming apparatus.

According to one aspect of the present invention is to provided an image processing system comprising an input-output control unit which is connected between an output unit for generating digital image signals and plural image forming units for image formation in response to said digital image signals and which is adapted to drive simultaneously functioning ones among said plural image forming units in response to said digital image signals supplied from the output unit.

According to another aspect of the present invention is to provided an image processing system comprising an input-output control unit which is connected between an output unit for generating digital image signals and plural image forming units for image formation in response to said digital image signals, and which is provided with synchronizing means for synchronizing the digital image signals, supplied from the output unit, with each of plural image forming units in order to achieve simultaneous image formations in plural image forming units in response to said digital image signals.

According to another aspect of the present invention is to provided an image processing system comprising an input-output control unit which is connected between an output unit for generating digital image signals and plural image forming units for image formation in response to said digital image signals, and which is provided with designating means for designating the availability of plural image forming units and is adapted to prohibit image formation, in response to the image signals from the output unit, in the image forming unit disabled by the designating means.

According to still another aspect of the present invention is to provided an image processing system comprising an image output unit provided with synchronization signal selecting means for enabling output of digital image signals in synchronization either with external synchronization signals or with internal synchronization signals.

According to still another aspect of the present invention is to provided an image processing system comprising an input-output control unit which is capable of correcting the number of image formations in case of a failure in any of plural image forming units simultaneously activated for simultaneous image formation in response to the image signals from an output unit, whereby the output unit can be operated in continuous manner without interruption in the signal output operation.

According to yet another aspect of the present invention is to provided an image processing system in which an output unit for generating image signals transmits the total number of image formations to an input-output control unit prior to the image forming operation, and said input-output control unit transmits the current number of image formations conducted by the image forming units to the output unit, whereby the image forming operation is controlled by said output unit.

According to yet another aspect of the present invention is to provided an image processing system in which an output unit selects, in a mode for forming an image in one of the image forming units in response to image signals supplied from said output unit, the sheet feed path of said image forming unit, or selects, in a mode of using plural image forming units, an available sheet size transmitted from the input-output control unit.

According to still another aspect of the present invention is to provided an image processing system in which a start instruction for the operation thereof is given by an output unit, and image forming units are controlled by an input-output control unit receiving said instruction.

According to still another aspect of the present invention is to provided an image processing system, in which plural output units are given mutually different identification numbers while plural image forming units are given mutually different identification numbers, and an input-output control unit controls the connection between said output units and said image forming units by said identification numbers.

Still another object of the present invention is to provided an image processing system which enables adequate control for simultaneous plural image formations, and provides advanced performance with easy operations for the operator. More specifically, in case of a failure in any of plural image forming units prior to the completion of image formations of a preset number, the output unit displays the number of outputs for correction and accordingly performs output operations after the completion of the output operations of the preset number.

According to yet another aspect of the present invention, in the case of a failure in any of plural image forming units, disabled image formation as long is not indicated as there remains an operable image forming unit and to continue the image forming operation with such operable image forming unit.

Another aspect of the present invention is to count the number of image formations according to the number of the image forming units available for image formation or to the status thereof.

Another aspect of the present invention is to display, in the output unit, all the sizes of recording sheets changed in plural image forming units.

Still another aspect of the present invention is to vary the display on the output unit according to the number of image forming units connected to said output unit and available for image formation.

Still another aspect object of the present invention is an image processing system capable, in case of a demand for image formation by a particular image forming unit during an image forming operation by plural image forming units, of interrupting the image forming operation already under way and preferentially conducting the newly demanded image formation.

Still another aspect of the present invention is an image processing system in which, if a first image forming unit is disabled during an image forming operation, the disabled image formation is conducted instead by a second image forming unit.

Still another aspect of the present invention is an image processing system comprising an output unit for generating digital image signals, plural image forming units for image formation in response to said digital image signals, and an input-output control unit for selectively supplying said plural image forming units with the digital image signals from said output unit, wherein said input-output control unit is adapted, during an image forming operation by the selected image forming unit, to control the operation of the unselected image forming units.

Still another aspect of the present invention is an image processing system capable, in the case of a failure in at least one of the plural image forming units during an image forming operation thereof, of selecting either a mode in which the disabled image formation is conducted instead by other image forming units, or a mode in which the image formation is entirely prohibited.

The foregoing and still other objects of the present invention, and the advantages thereof, will become fully apparent from the following description.

BRIEF DESCRIPTION OF THE DRAWINGS

FIG. 3 is a block diagram showing the internal structure of a multi-input multi-output apparatus (MIMOU);

FIG. 5 is a block diagram showing the internal structure of a printer;

FIG. 6 is a timing chart related to image signals;

FIG. 8 is an external view of an operation unit of a MIMOU;

FIG. 9 is a flow chart showing the procedure of timing signal selection by the reader at the start of power supply;

FIGS. 10(a) and 10(b) are views showing examples of display in special operations of the reader;

FIGS. 12(a) and 12(b) are flow charts of serial communication by the reader when a copy sequence is not executed;

FIGS. 13(a) and 13(b) are flow charts of a program to be executed, at the copying operation, by a microcomputer in the reader;

FIGS. 18-1 to 18-4 are schematic views showing examples of multi-mode connection;

FIGS. 20-1, 20-2(a), 20-2(b), 20-3(a) and 20-3(b) are flow charts of shut-off operation.

DETAILED DESCRIPTION OF THE PREFERRED EMBODIMENTS

Now the present invention will be clarified in detail by embodiments thereof.

Figure 1:
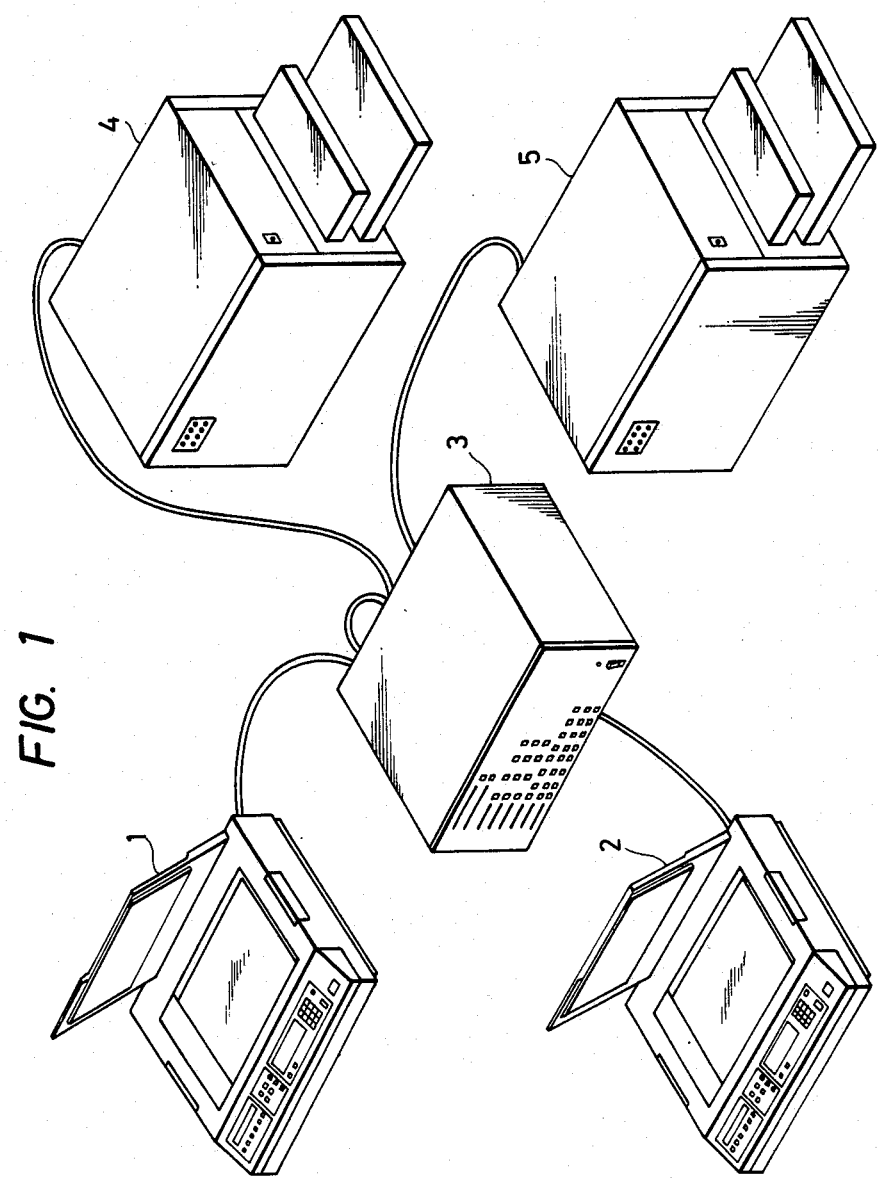
FIG. 1 is an external view of a system embodying the present invention.

FIG. 1 is an external view of a system embodying the present invention. In the following there will be explained an embodiment applied to black-and-white image processing, but it is to be understood that the present invention is applicable also to color image processing.

Signal lines of readers 1, 2 for reading original images are connected to a multi-input multi-output unit 3 of which signal lines are connected to printers 4, 5 for image recording on recording materials such as paper. In FIG. 1 there are employed only two readers and two printers, but combinations with more or fewer units are naturally possible. In the present embodiment it is assumed that the multi-input multi-output unit 3 can be connected at maximum with four readers and eight printers. In addition to the printers there may be provided display units such as cathode ray tubes and memories such as disks.

Now reference is made to FIGS. 2 to 5 for detailed explanation on the internal structure of the above-explained reader, printer and multi-input multi-output unit.

Figure 2A:
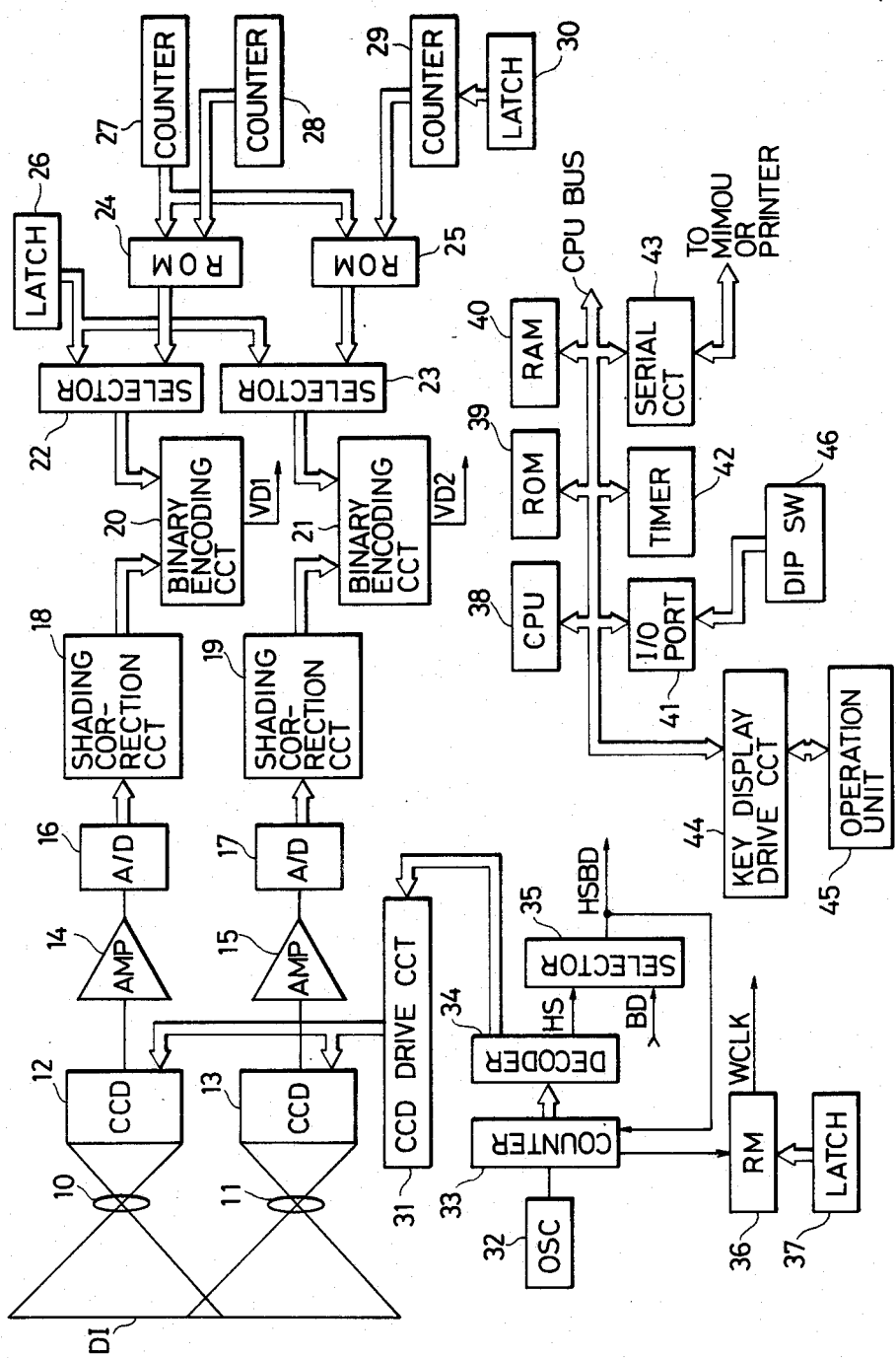
FIGS. 2(a) and 2(b) are block diagrams showing the internal structure of a reader.
Figure 2B:
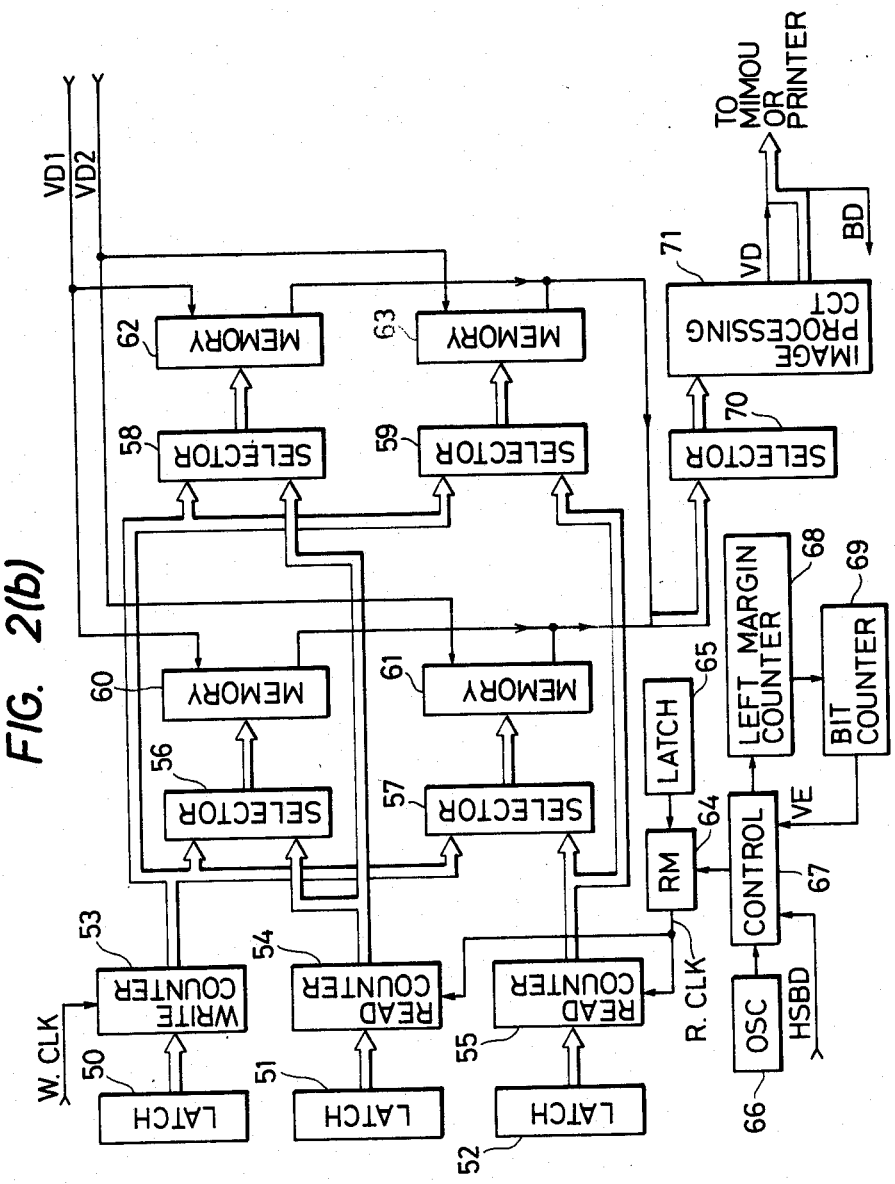

FIGS. 2A and 2B illustrate the internal structure of the readers 1, 2.

In the present embodiment, in order to achieve high-speed image reading with a high resolving power, the original image is read by two charge-coupled devices (CCD), and the obtained signals are jointed to generate image signals of a line. Naturally the image sensor is not limited to CCD's, and the number thereof is not limited to two.

At first reference is made to FIG. 2A. Optical lenses 10, 11 are used for focusing the image DI of an original document placed on an unrepresented original carriage onto CCD's 12, 13. Said original image is scanned in continuous manner by an unrepresented optical system, but such image reading technology is already well known and will not therefore be explained in detail.

The CCD's 12, 13 convert the density of the original image into electrical signals, which are amplified in amplifiers 14, 15 and converted in analog-to-digital converters (A/D converters) 16, 17 into digital signals of multiple bits, for example 6 bits per pixel.

Said digital signals are subjected, in shading correction circuits 18, 19, to the elimination of shading phenomenon resulting for example from unevenness in the intensity of the light source, in the luminance distribution of the optical system and in the sensitivity of the CCD's, and are then supplied to binary encoding circuits 20, 21 for conversion respectively to binary digital image signals VD1, VD2.

Said binary encoding can be achieved either with a constant binary encoding level determined by a latch circuit 26, or with a binary encoding level which is periodically modified within a determined matrix size by dither ROM's 24, 25 according to so-called dither method, and selectors 22, 23 select either of the above-mentioned two methods. The dither method reproduces intermediate tones with binary signals and is widely used in the facsimile etc.

The present embodiment allows one to obtain an optimum copy by selecting the method with a constant binary encoding level for originals consisting of characters, and selecting the dither method for originals requiring intermediate tones, for example photographs.

The dither ROM 24, 25 read, in successive manner, dither patterns stored at addresses determined by a counter 27 for counting the number of lines in the subsidiary scanning direction and by counters 28, 29 for counting the number of pixels in the main scanning direction. In order to avoid possible distortion in the dither pattern at the junction of the electrical signals supplied from the CCD's 12, 13, a latch circuit 30 is provided to supply preset data of optimum count to the counter 29.

Said latch circuit 30, and other latch circuits 26, 37, 50-52, 65 shown in FIGS. 2A and 2B, are connected to a bus line of a central processing unit (CPU) 38 and the data are latched by the CPU 38. The CPU 38 functions according to a control program stored in a ROM 39, and controls the functions of the entire reader by means of a RAM 40, an I/O port 41, a timer circuit 42, a serial circuit 43 and a key-display driving circuit 44.

In addition the CPU 38 performs control for adjustment or confirmation of functions in response to certain values set by a dip switch 46.

Key-display driving circuit 44 scans key matrixes in an operation unit 45 and drives a display unit composed for example of light-emitting diodes. The serial circuit 43 supplies control instructions to and receives information from the multi-input multi-output unit (MIMOU).

An oscillator circuit 32 supplies timing signals to a CCD driver circuit 31 for driving the CCD's 12, 13, and also to other units involving image signals. The oscillated signals are counted by a counter 33, and the obtained count is supplied to a decoder 34 for generating various timing signals.

The decoder 34 supplies an internal synchronization signal HS for each line to a selector 35, which also receives a similar synchronization signal BD (to be explained later) from a printer if it is connected. The CPU 38 selects, according the procedure shown in FIG. 9, either the signal BD when the printer is directly connected to the reader, or the signal HS when the multi-input multi-output unit is connected to the reader. Thus selected signal HSBD is utilized as the synchronization signal in the subsidiary scanning direction. Said signal HSBD is supplied also to the counter 35 for resetting the count thereof.

A counter 33 generates original clock pulses which are used for generating write-in clock pulses for storing the image signals VD1, VD2 into memories 60-63 to be explained later, from binary encoding circuits 20, 21. Said original clock pulses are supplied to a rate multiplier 36 to provide the memory write-in clock signals WCLK. Said rate multiplier 36 divides the frequency of the entered clock pulses according to an external control signal, supplied in the present embodiment by the latch circuit 37. In the present embodiment said rate multiplier is used for modifying the image magnification in the main scanning direction.

Now reference is made to FIG. 2B, wherein latch circuits 50, 51, 52 latch the data from the CPU 38 and provide preset data respectively to a write-in counter 53 and read-out counters 54, 55. The write-in counter 53 generates memory addresses for storing the signals VD1, VD2 in the memories 60–63 in response to the signal WCLK supplied from the rate multiplier 36. The read-out counters 54, 55 generate memory addresses for reading the signals VD1, VD2 from the memories 60–63, in response to a signal RCLK to be explained later.

The memory address signals generated by said write-in counter 53 and read-out counters 54, 55 are supplied to selectors 56–59, which select either of the signals from the write-in counter 53 and from the read-out counters 54, 55 and supplies thus selected signal to the memories 60–63.

There are provided a set of memories 60, 61 and another set of memories 62, 63, and the signal rate conversion is achieved by an operation in which either set is writing data while the other is in the data read-out.

Each memory set repetitively performs the signal write-in and the signal read-out, respectively in response to the signals from the write-in counter 53 and to the signals from the read-out counters 54, 55 supplied through the selectors 56–59. The repetition of said write-in and read-out operations is controlled in response to the aforementioned signal HSBD.

The signals VD1, VD2 read from the memories 60–63 are supplied to a selector 70 for synthesis into the image signals of a line, which are supplied to the printer or to the multi-input multi-output unit after editing such as image inversion or trimming in an image processing circuit 71.

An oscillator circuit 66 generates oscillation signals used as reference timings at the signal read-out. A control circuit 67 performs the signal read-out control in response to the signal HSBD from the selector 35, and also controls the functions, according to determined timings to be explained later, of a left margin counter 68 and a bit counter 69. Said bit counter 69 releases a signal VE indicating the effective output period of the image signals.

A rate multiplier 64 and a latch circuit 65 generate read-out clock signals RCLK in a similar as the aforementioned rate multiplier 36 and latch circuit 37.

Figures 1, 18:
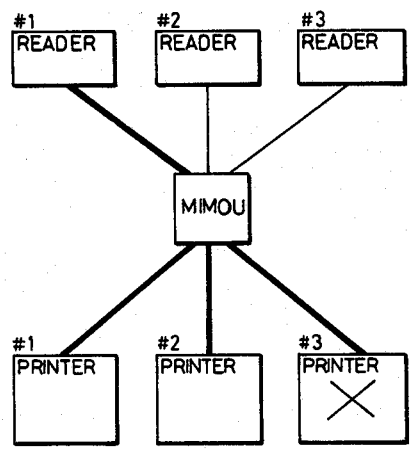
Figures 2, 18:
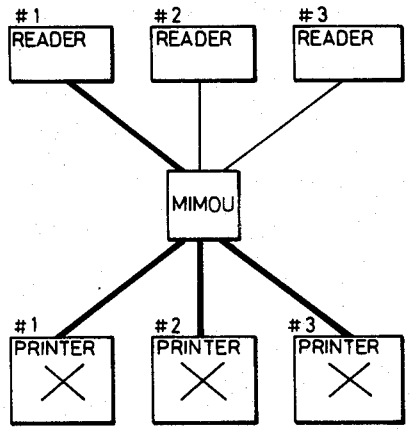
Figures 3, 18:
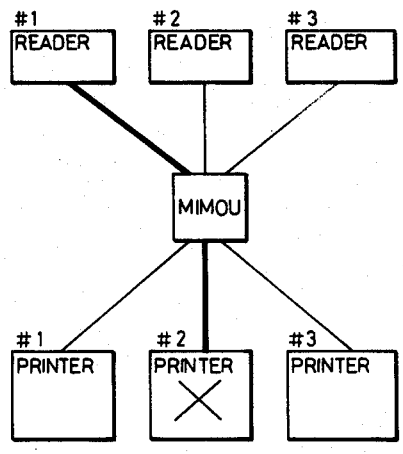
Figures 4, 18:
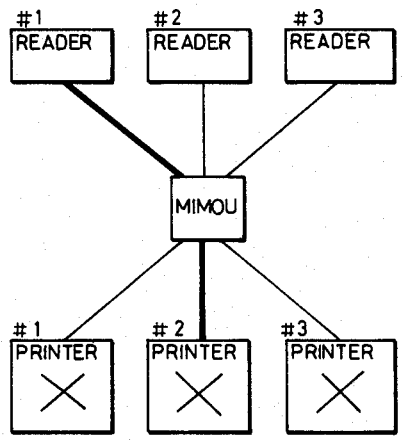

Now reference is made to FIG. 3 showing the internal structure of the multi-input multi-output unit (MIMOU) In FIG. 3 there is shown a structure in which a MIMOU 100 is connected to four readers 101–104 and to eight printers 111–118.

The MIMOU 100 is composed of a multi-input multi-output controller (MIMOC) 120, synchronous memory board (SBD) 121–128 respectively corresponding to printers 111–118 and an operation unit 147.

The MIMOC 120 is connected to readers 101–104 and comprises serial circuits 131–134 to be connected with the serial circuit 43 of each reader (FIG. 2A), and a serial circuit 135 to be connected, through the SBD's, to the printers 121–128. These circuits are controlled by a CPU 140, which functions according to a control program stored in a ROM 141 and controls the entire MIMOU 100 through a RAM 142, an I/O port 143, an interruption controller 144, a timer circuit 145 and a key-display driving circuit 146 connected to a bus line.

The MIMOC 120 is provided with a control bus CB and an image bus IB both connected to the SBD's 121–128.

The image bus IB transmits the image signals supplied from the readers 101–104 and control signals controlling the transfer of said image signals.

The control bus CB transmits serial signals to and from the printers 111–118, which exchange information with the MIMOU 100 by the serial signals generated in the serial circuit 135, and SBD control signal from the I/O port 143.

In the present embodiment, the copy start instruction is to be given by the readers, to which the MIMOU 100 functions as a slave. In order to prepare for the serial signal from the readers at any time, the MIMOU is provided with a serial circuit for each reader, and the CPU 140 is prepared to respond to the serial signal from any reader. On the other hand the MIMOU 100 functions as a master to the printers, a single serial circuit 135 can exchange serial signals with plural printers by conducting said exchange in successive manner with each printer.

The operation unit 147, of which details will be explained later, performs the key matrix scanning and drives the display unit through the key-display driving circuit 146.

Figure 4:
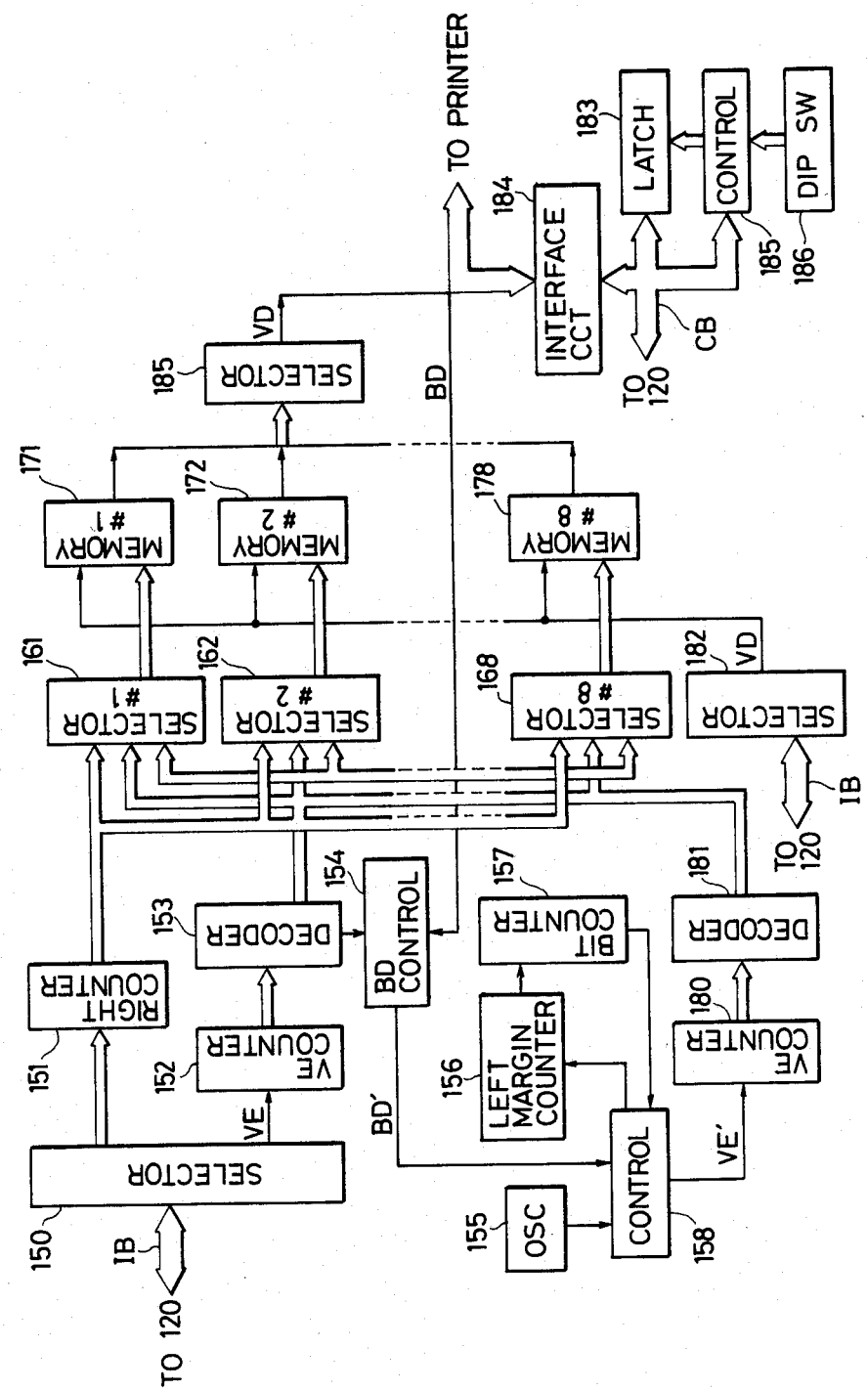
FIG. 4 is a block diagram showing the internal structure of a synchronization memory board (SBD)

The SBD's 121–128 are used for synchronizing the image signals from the readers with the function of the printers, and will further be explained in relation to FIG. 4.

FIG. 4 shows the circuit structure of one of the SBD's 121–128, and they are of a same structure.

In FIG. 4, a selector 150 selects, from image control signals supplied from plural readers, a reader control signal allotted to the CPU 140. The selected control signal is supplied to a write-in counter 151 and a VE counter 152 to generate an address signal for storing the image signals into memories 171–178 and a selection signal for the memory write-in.

A selector 182 selects the image signals from the readers, and the selected image signals are supplied in parallel manner to the memories 171–178 each capable of storing the image signals of at least a line and are stored in one of said memories selected by selectors 161–168 provided respectively corresponding to said memories.

The write-in counter 151 generates an address signal for storing the image signals in the memories 171–178, and said address signal is supplied to the selector 161–168.

The VE counter 152 counts control signals VE indicating one line of the image, and the obtained count is supplied to a decoder 153, which supplies the selectors 161–168 with a selection signal for selecting one of the memories 171–178 for signal storage.

These circuits are initialized by a control signal VSYNC indicating the start of an image supplied from a connected reader. The signal storage in the memories is conducted in repetitive manner, in the order of 171, 172, 173, . . . , 177, 178 171, . . . .

On the other hand, the image signal read-out from the memories 171–178 is started when the image signals are stored in a half of the entire memories, namely when the image signals are stored, in the present embodiment, in the memory 174. The control signal for starting said signal read-out is generated in the decoder 153 and supplied to a BD control circuit 154.

The BD control circuit 154, after initialized by the above-mentioned signal VSYNC, prohibits the output, to a control circuit 158, of a signal BD from the connected printer until a read-out start control signal is supplied from the decoder 153. When said prohibition is released, the obtained output signal BD' activates the control circuit 158, thus effecting the signal read-out from the memories in the order of 171, 172,—173, . . . —, 177, 178, 171, —. . . ,—in the same manner as in the signal write-in. The signal write-in and the signal read-out do not take place at the same time in a same memory, since the signal write-in and the signal read-out are conducted with a delay of a certain number of lines.

Figures 1A, 17:
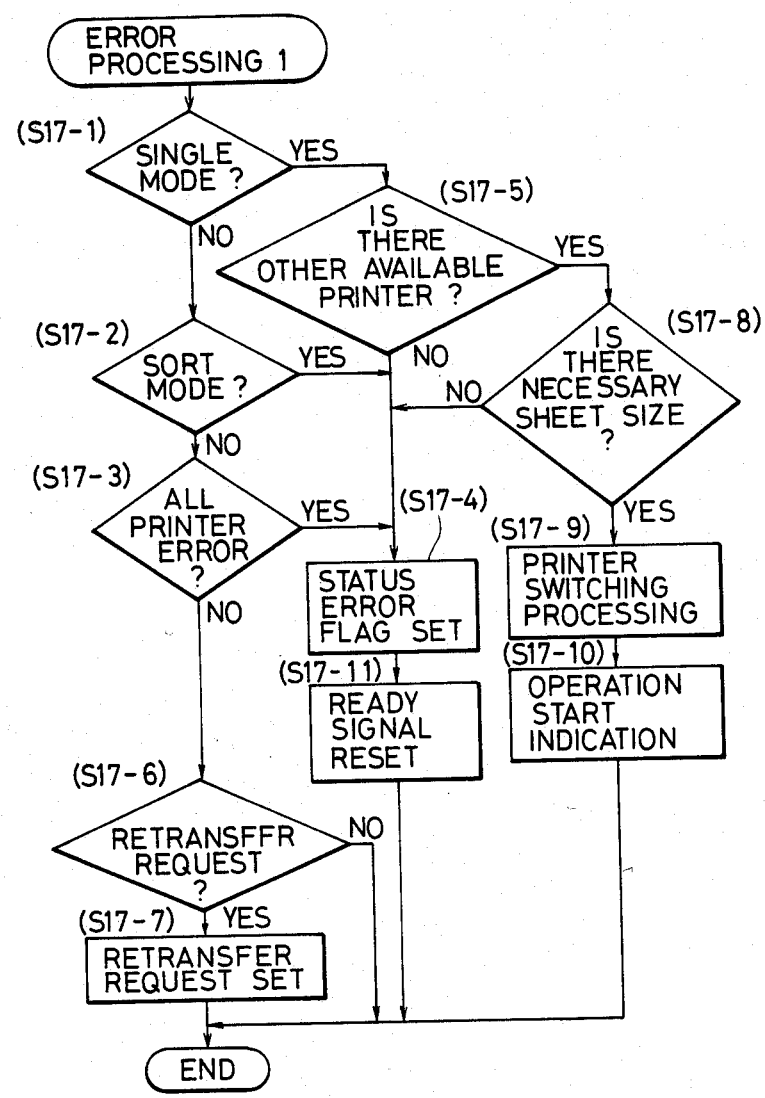
FIGS. 17-1(a), 17-1(b) and 17-2 are flow charts of error processing for the multi-input multi-output apparatus and for the reader.
Figures 1B, 17:
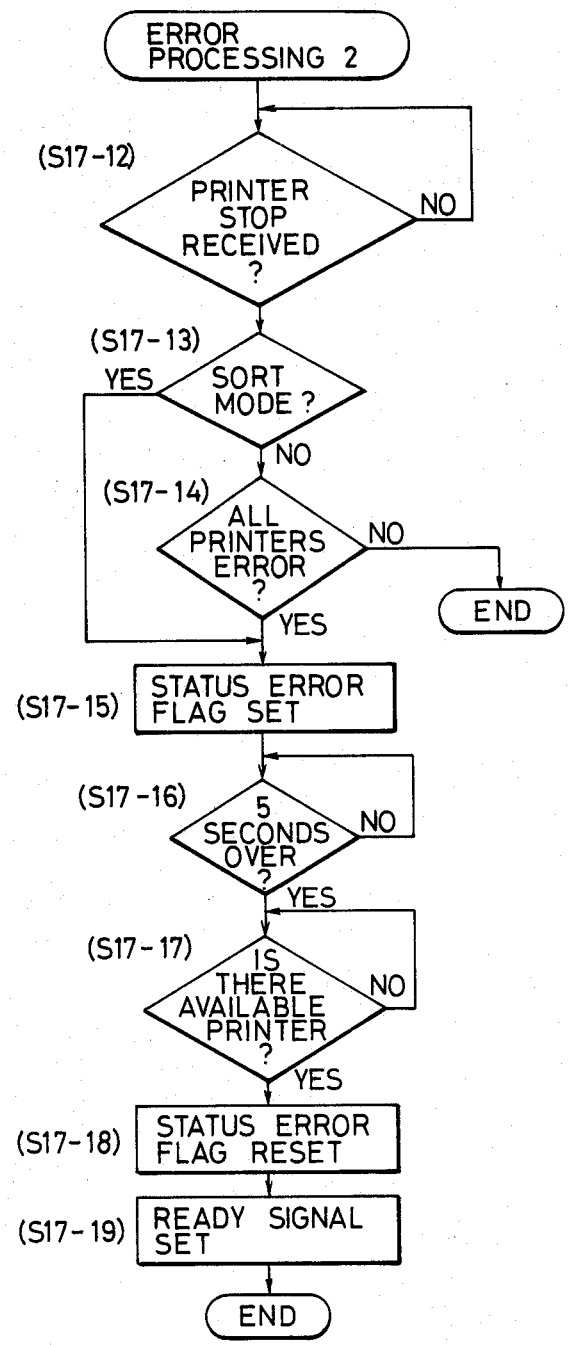
Figures 2, 17:
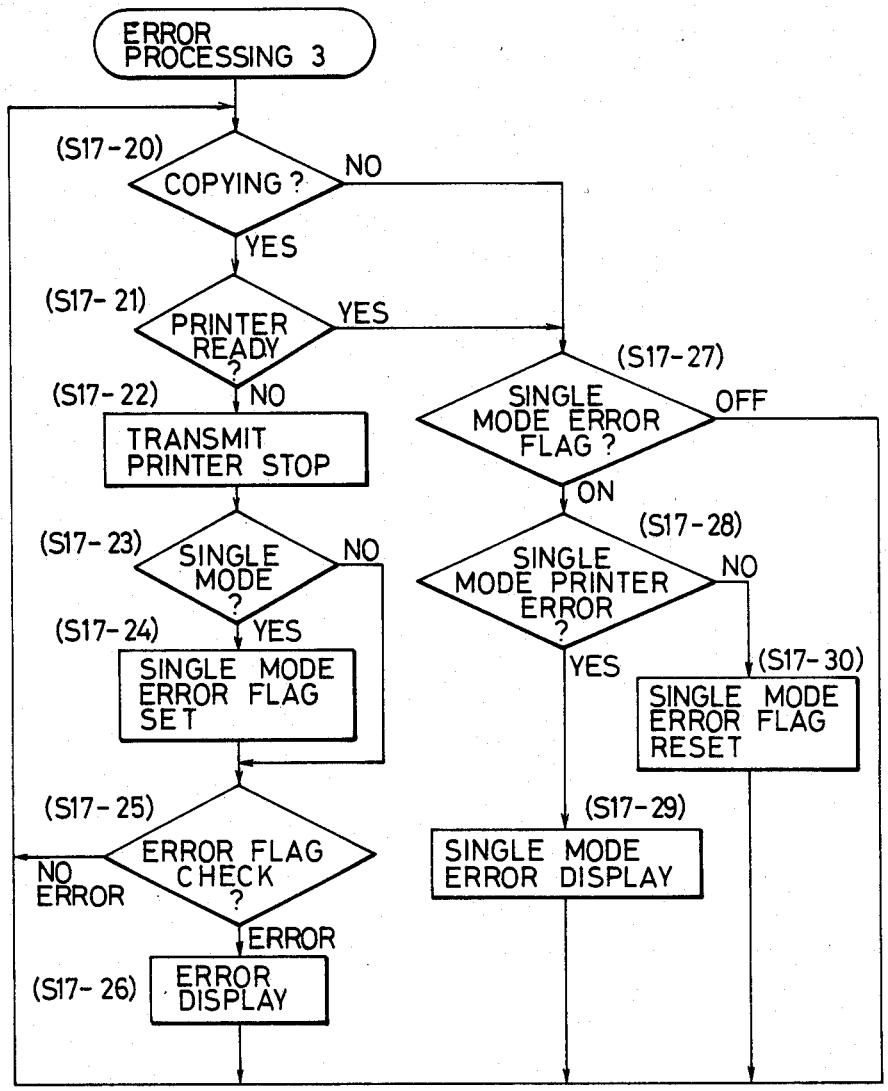

An oscillator circuit 155, a control circuit 158, a left margin counter 156 and a bit counter 157 perform a function substantially similar to that of the oscillator circuit 66, control circuit 67, left margin counter 68 and bit counter 69 of the reader shown in FIG. 2, except a fact that the control circuit 158 supplies a VE counter 180 with a signal VE' similar to the signal VE.

The VE counter 180 counts the signal VE' and the obtained count is supplied to a decoder 181 for generating a selection signal supplied to the selectors 161–168 and deciding a memory for signal read-out.

The selectors 161–168 control the signal write-in to and read-out from the memories 171–178, according to the signals from the write-in counter 151 and the decoder 153, or from the bit counter 157 and a decoder 181.

The selector 185 selects, among the image signals read from the memories 171–178, the image signals from a memory selected for signal read-out, and sends said image signals, as the signals VD, to the printers.

The control bus BC is connected to a latch circuit 183, an interface 184 and a control circuit 185.

A latch circuit 183 latches a selection control signal to the selectors 150, 182, when the control circuit 185 identifies the coincidence in the control bus signals, between a value determined by a dip switch 186 for each SBD and the number of SBD designated by the control bus CB. The selection control between the MIMOC 120 and the SBD's is achieved in this manner by a value determined by a dip switch 186 provided for each SBD.

Now reference is made to FIG. 5 showing the internal structure of the printer.

Serial signal from the MIMOU 100 or a reader is supplied to a serial circuit 201 and is processed in a CPU 200, which functions according to a control program stored in a ROM 203, and controls the entire printer through a RAM 204, a timer circuit 202 and an I/O port 205.

An input interface 207 performs input process for example for a sensor signal for sheet detection etc. in the printer. A driver circuit 208 controls driving members in the printer such as an unrepresented motor, a high-voltage transformer etc. A display circuit 206 indicates the status of printer such as absence of printing sheet, sheet jamming etc.

The image signals VD supplied either from the MIMOU 100 or the readers are supplied to a laser driver 209 and are converted in a semiconductor laser 210 into a laser beam corresponding to the signals VD. Said laser beam is concentrated by a collimating lens 211 and performs a scanning motion, by a polygonal mirror 212, substantially parallel to the rotary axis of a photosensitive drum 214. The laser beam in scanning motion is corrected in intensity by an f-$\theta$ lens 213, and irradiates the photosensitive drum 214 to form a latent image corresponding to the signal VD.

The image formation in the printer is achieved by so-called electrostatic recording, in which a charge deposited on the photosensitive drum 214 is selectively eliminated by the laser beam and is developed with a developing material into a visible image which is then transferred onto a recording sheet and fixed thereon. Such electrostatic recording process is already well known and is therefore not explained in detail.

The laser beam put into the scanning motion by the polygonal mirror 212 enters an optical fiber 215 before irradiating the photosensitive drum 214. A photodetector 216 detects said laser beam to generate an electrical signal BD. As will be understood from FIG. 5, the latent image can be formed at an appropriate position on the photosensitive drum 214 if the signals VD are released with a delay, after said signal BD, corresponding to the time required by the laser beam to reach the photosensitive drum 214.

The timing of said signals VD is shown more detailedly in FIG. 6.

FIG. 6 shows the example in a reader, but the MIMOU performs a similar function by means of the left margin counter 156 and bit counter 157 instead of the left margin counter 68 and bit counter 69.

In FIG. 2B, the left margin counter 68 starts counting operation in response to the signal HSBD corresponding to the signal BD, and, upon completion of a counting operation corresponding to a time required for the laser beam to reach the photosensitive drum from sad signal BD, the bit counter 69 is activated to initiate the read-out of the signals VD from the memories 60, 61 or from the memories 62, 63. The bit counter 69 terminates the operation thereof after the output of the signals VE over an image-forming area of the photosensitive drum 214 to prepare for the entry of a signal HSBD corresponding to a succeeding signal BD.

The signal VE indicates the period of operation of the bit counter 69, and is used for controlling the functions of the MIMOU, VE counter 152 and write-in counter 151. The signal VE' generated in the control circuit 158 in the MIMOU is similar to said signal VE.

Figure 7:
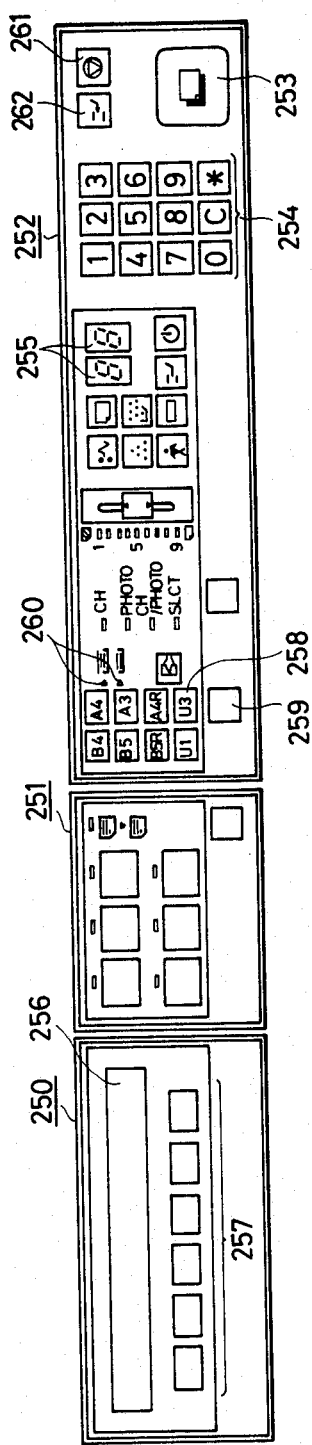
FIG. 7 is an external view of an operation unit of a reader.

FIG. 7 shows an operation unit provided on a reader to be connected to the present system. The operation unit is provided with a standard operation unit 252, a preset operation unit 251, and a special operation unit 250 in turn provided with a liquid crystal display unit 256 and a soft key unit 257. The standard operation unit 252 is provided with numeral keys 254 for entering copy number, a set number display unit 255, a copy start key 253 etc., which are used in a similar manner as in the ordinary copiers.

The special operation unit 250 is used for creating an arbitrary copy mode by the operator, and is provided with six software keys 257 and a liquid crystal display unit 256 capable of displaying labels, copy modes, data and messages corresponding to said keys, whereby a copy mode can be created by depressing a software key corresponding to a desired display on the display unit 256.

For example a desired sheet size can be selected among the sheet sizes displayed on said display unit, by depressing a software key positioned under the desired size. Also the liquid crystal display unit 256 can display information which cannot be displayed in the standard operation unit 252, for example the number of printers used in a multi-mode copying operation to be explained later utilizing plural printers.

The preset operation unit 251 is used for registering the copy mode set by the standard operation unit 252 or by the special operation unit 250. Thus a frequently used copy mode is registered in a RAM 40 and can be easily recalled with a single key operation, without the use of the special operation unit 250.

FIG. 8 shows an example of the operation unit provided on the MIMOU, wherein an operation panel 300 is positioned on the front face thereof (cf. FIG. 1).

A power LED (light-emitting diode) 301 indicating the state of power supply is lighted only when the power supply is turned on.

A ready LED 302 indicates, when lighted, that the MIMOU is ready for operation without any trouble therein. Reader numbers 1-4 and printer numbers 1-8 represent identification numbers to be given to four readers and eight printers connectable to the MIMOU of the present embodiment, and related LED's and switches 303-338 indicate the information on the corresponding readers and printers.

For example the LED's 303, 307 and the switch 311 indicate information on a first reader 101, while the LED's 325, 333 and the switch 317 indicate information on a third printer 113.

Each of multi-single LED's 303-306 indicates whether a corresponding reader is in a multi mode or in a single mode respectively when it is continuously lighted or flashes, and it is continuously turned off when the corresponding reader is not connected or not powered.

Copying LED's 307-310 are lighted or turned off respectively when the corresponding readers are in a copying operation or not.

Each of operating printer switches 311-314, if actuated during a copying operation, i.e. an original reading operation (thus the copying LED's 307-310 being lighted) of the corresponding reader, indicates the printers in operation corresponding to said printer by flashing connection LED's 323-330 of the corresponding printers.

Printer connection switches 315-322 select, when the corresponding printers are operable for copying, whether or not to allow automatic selection of said printers by the MIMOU, and the state of selection is indicated by printer connection LED's 323-330, each of which is turned on and off repeatedly by the actuations of corresponding one of the switches 315-322. The turned-on state of said LED indicates that the corresponding printer is available for copying operation under the control of the MIMOU while the turned-off state indicates that said printer is not controllable by the MIMOU. As explained before, said LED's 323-330 blink when the operating printer switches are actuated during a copying operation.

Printer ready LED's 331-338 indicate whether the corresponding printers are ready for copying operation, and are lighted regardless of the state of the connection LED's if the printers are ready for the copying operation, while they blink in the presence of an error such as sheet jamming in the corresponding printers. These LED's are turned off when the corresponding printers are not connected or not powered.

The reader units and the printer units can be connected either directly or through the multi-input multi-output unit, and either of such connecting methods is selected according to the application status to be explained later. The plural readers are connected with the MIMOU respectively through serial circuits with identification numbers, so that said readers are identified by the number of said serial circuits. The printers are connected with the MIMOU respectively through the SBD as explained above, so that the printers are identified by the values of the dip switches 186 on said SBD.

In case the readers are connected with the printers through the MIMOU, the readers can select either a single mode or a multi mode.

The single mode is similar to a case of direct connection between the reader and printer, and the reader of an identification number is connected by the MIMOU with the printer of a same identification number. In this mode the status of the printer is transmitted to the reader through the MIMOU.

In the multi-mode, a reader is connected with plural printers through the MIMOU, and the selection of printers may be made manually or automatically by the MIMOU. In the latter case the MIMOU suitably selects printers among operable ones according to the number of copies set in the reader. In said multi mode the status information of the printers is assembled in the MIMOU and transmitted to the reader.

In said multiple mode, in case a part of operating plural printers becomes inoperable, there may be employed either an "ALL" mode in which the interrupted printing operation is conducted by other operable printers to complete the desired number of copies, or a "sort" mode in which the entire printing operation is interrupted when at least one of operating plural printers becomes inoperable.

Stated differently, in said "sort" mode, it is prohibited to replace the printing operation of the inoperable printers automatically with that of other printers.

Consequently, in such "sort" mode, there are obtained collated or sorted copies without overlapping among different printers.

The control in the case of direct 1-to-1 connection between the reader and the printer is similar to the control in the single mode with the MIMOU and is therefore omitted from the following description, and, in the following, there will be explained the process of communication in a system involving the MIMOU. The difference between the single mode and the multiple mode will be explained for each case.

At first reference is made to FIG. 10 for explaining the examples of setting multiple modes by the special operation unit 250, comprising a liquid crystal display unit 256 and six software keys (SK) 257.

Figure 10A:
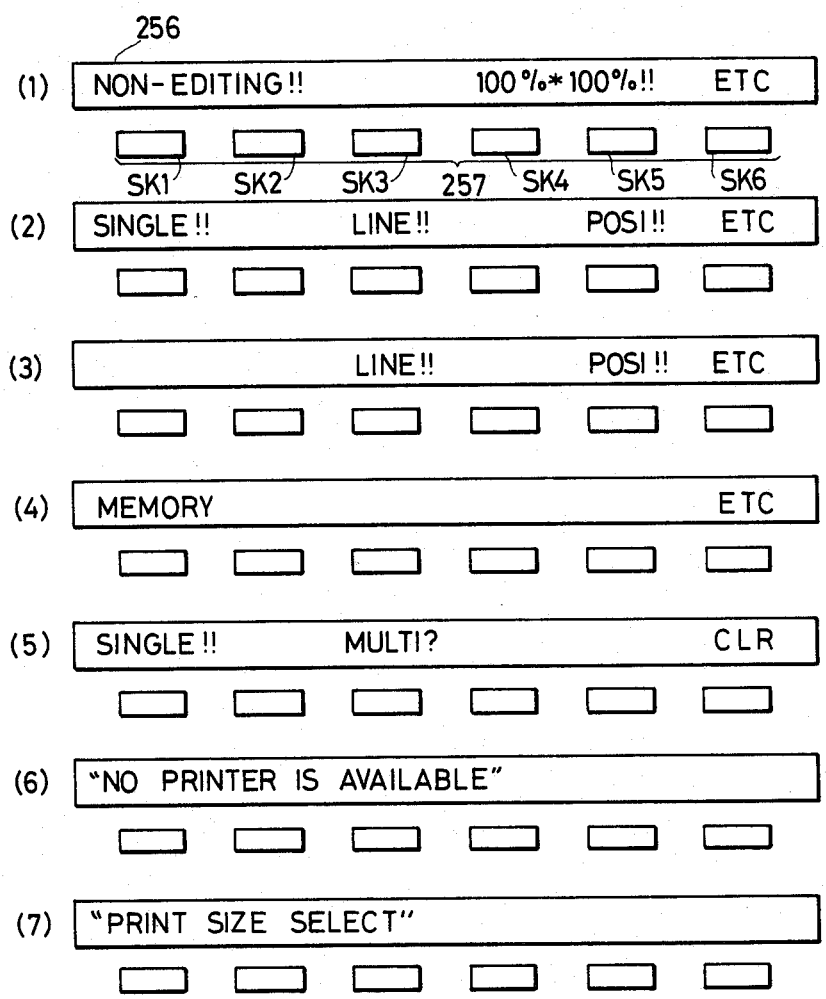

In response to the turning on of the power supply, the liquid crystal display unit 256 provides a display (1) shown in FIG. 10A, wherein a message "NON-EDITING!!" given corresponding to the keys SK1, SK2 indicates the absence of any editing mode.

Upon actuation of the key SK1 or SK2, the liquid crystal display is changed to enable setting an editing mode, though the details thereof are omitted. A message "100% * 100%" displayed corresponding to the keys SK4, SK5 indicates that the image magnifications in the main and subsidiary scanning directions are both 100%, namely the obtained image is of a same size as the original image. Upon actuation of the key SK4 or SK5 in this state, the liquid crystal display is changed, thus enabling to modify the image magnification by a step of 1% within a range from 50% to 200%, for each of the main and subsidiary scanning directions, but the detailed procedure of image magnification setting is omitted. In the state shown in FIG. 10A(1), upon actuation of the key SK6 corresponding to a message "ETC", the display is changed as shown in (2).

In FIG. 10A(2), a message "SINGLE" displayed corresponding to the key SK1 indicates that this reader is connected to the MIMOU 100 and that there is selected an image transmitting mode through the MIMOU to a printer controlled by this reader. On the other hand, if the reader is directly connected to the printer without the MIMOU, namely as a stand alone type system, no message is displayed corresponding to the key SK1, as shown in FIG. 10A(3). A message "LINE!!" displayed corresponding to the keys SK4, SK5 in FIG. 10A(2) indicates a process for a character original in which the read image is reproduced in binary values, disregarding intermediate tones. Upon actuation of the key SK3 or SK4 in this state there is given an unrepresented message "HALF TONE", indicating a mode of reproducing intermediate tones with the aforementioned dither method in response to an original involving intermediate tones such as a photograph. A message "POSI" displayed corresponding to the key SK5 indicates a positive process in which the ordinary copying operation is conducted. Upon actuation of the key SK5 in this state, the display is changed to an unrepresented message "NEGA" indicating a negative process in which the black and white areas are mutually inverted on the copy. Upon actuation of the key SK6 corresponding to the message "ETC", the display is changed as shown in FIG. 10A(4).

In (4), a message "MEMORY" displayed corresponding to the key SK1 means indicates registration, and, upon actuation of the key SK1, there is adopted a mode of registering the currently adopted copying mode in one of nine preset keys 251 but the details of said mode will not be explained in detail.

Upon actuation of the key SK6 corresponding to the message "ETC" in the state (4), the liquid crystal display returns to the state (1).

In the state shown in FIG. 10A(2), upon actuation of the key SK1 corresponding to a message "SINGLE!!", the display changes to a state (5), and, upon actuation of the key SK6 corresponding to a message "CLR" (clear) in this state, the display returns to the state (2).

A message "MULTI?" displayed corresponding to the key SK3 indicates the absence of multiple mode setting, and indicates also that the multiple mode can be adopted by the actuation of the corresponding key SK3.

A message "SINGLE!!" is displayed corresponding to the key SK1 because there is currently adopted the single mode in which the signal transmission is made only to a printer controlled by this reader, namely a printer of an identification number same as that of this reader.

In the state (5), upon actuation of the key SK1 corresponding to the message "SINGLE!!" the display returns to the state (2) whereby the single mode is adopted. In said single mode, the operation is controlled through the printer as in a stand-alone system, although the reader is connected with the printer through the MIMOU so that the image signals are transmitted from the reader to the printer through the MIMOU. Consequently the size of the recording sheet in the printer, namely the size of the cassette containing the recording sheets, is selected by the upper/lower cassette selecting key 259 in the standard operation unit 252. In this case one of upper/lower cassette LED's 260 is lighted corresponding to the selected cassette, and one of size LED's 258 is lighted also corresponding to the size of the sheets contained in said cassette.

In the state (5), upon actuation of the key SK3 corresponding to a message "MULTI?", the display changes to a state shown in (7) with a message requesting the selection of a cassette size. If no one is available for copying among the printers connected through the MIMOU, there is given a display (6) indicating such state. The display (6) returns to the state (2) after a determined time controlled by the CPU or upon actuation of the clear key in the standard operation unit 252 shown in FIG. 7.

Also the display in the state (7) changes as shown in (8) after a determined time or by the actuation of the clear key.

The display shown in (8) indicates the available sizes of the cassettes mounted on the available one among all the printers controlled by the MIMOU 100. If a desired size is found among the initially displayed sizes, a software key corresponding to the display of said size, whereupon the display changes to a state shown in (10). On the other hand, if a desired size is not found, the key SK5 corresponding to the message "ETC" is actuated, whereupon other available sizes which could not be displayed before, if any, are displayed in the same manner as in (8). In this manner the key SK5 corresponding to the message "ETC" is actuated until a desired size is displayed. After the display all available sizes the display returns to the initial display of available sizes for example (8) in FIG. 10B.

In the key SK6 is actuated during said size selection, the display returns to the state (5). If the size is already selected before, there is given a display for example (9) instead of the state (8). The state (9) shows a case in which the A4-size is selected, and said selection is indicated by "A4!!" instead of a mark "?".

Upon completion of the size selection, there is given a display as shown (10)including a message asking the operator to select the printer to be used. Said message is cleared, like the message for example in the state (7), after the lapse of a determined time controlled by the CPU or by the actuation of the clear key shown in FIG. 7, whereby the liquid crystal display changes for example to a state (11).

In said state (11) there are displayed numbers of the printers with a cassette size selected in the above-described procedure. Upon actuation of the key SK6 in this state, the display returns to the state (5) to enable a new mode setting. In the state (11), numbers displayed, with a mark "#", corresponding to the keys SK2, SK3 indicate the identification numbers of the printers. A mark "?" following number indicates that the printer with said identification number is still available for selection as a destination. The "#" number of a printer number blinks if said number is equal to the identification number of this reader in the single mode. For example, if this reader works with a printer #1 in the single mode, the mark "#" of the display "#1" in the state (11) performs blinking.

Information indicating the status of a single mode printer is obtained, in the serial communication between the reader and the MIMOU, from a 5th bit of a printer information status supplied, according to Tabs. 2-10 shown later, from the MIMOU to the reader in response a printer information requesting command supplied from the reader to the MIMOU according to Tab. 1.

In the state (11) in FIG. 10B, a message "ALL?" displayed corresponding to the key SK1 indicates a mode in which the MIMOU can arbitrarily select whether all the printers having the selected cassette size may be selected as destinations, or the printing operation may be conducted in any of the printers. For example, if the MIMOU is connected to three printers 1, 2 and 3 and the selected cassette size, for example A4-size, is mounted on the printers 1 and 2, there is obtained a dipslay as shown in (11). If the operator wishes to select the printer #2 as destination, the key SK3 corresponding to the message "#2?" is actuated whereby the mark "?" changes to "!!" as shown in (12), thus indicating the selection of the printer #2 as the destination. If this is satisfactory the key SK5 corresponding to a message "OK" is actuated to complete the setting of the multiple mode.

On the other hand, if the MIMOU is connected to three printers #1, #2 and #3 of which only two, for example #1 and #3 have the selected cassette size, for example A4-size, the display (10) is replaced by a state (13). In case the operator wishes that the copies can be made by any available printer as long as they are in A4-size, or that the copying operation should be completed as quickly as possible with all the available printers, the key SK1 corresponding to the message "ALL" whereby the display changes to a state (14) indicating the selection of the "ALL" mode. If this is satisfactory the key SK5 corresponding to the message "OK" is depressed to complete the setting of the multiple mode.

Also in case of sorting copies with a determined number of printers, the key SK4 corresponding to a message "SORT?" is actuated, whereby the display changes to a state (15), thus indicating the selection of the sorting mode. Subsequently the key SK5 is actuated if the setting is satisfactory. The difference between the "sort" and "all" modes lies in a difference in the process in case of an error in any of the printers in operation, and said difference will be explained more detailedly later.

States (11) to (14) illustrate cases in which all the selectable printer numbers can be displayed in a display frame, but there may be required two or three frames if the number of printers increases. Even in such case successive displays can be obtained by the message "ETC". In such case the selection "ALL" is particularly useful.

Figure 11A:
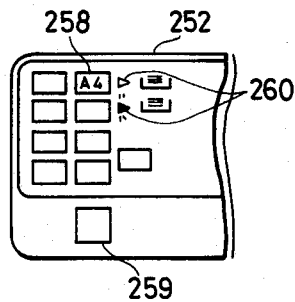
FIGS. 11(a), 11(b) and 11(c) are views showing examples of display for the sheet cassette sizes and for selection of the upper or lower cassette.
Figure 11B:
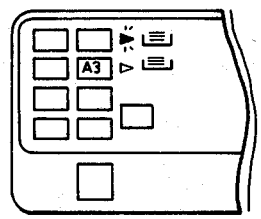
Figure 11C:
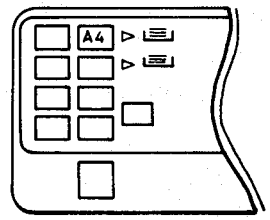

In a state (12), (14) or (15), the setting of the multiple mode is completed by the actiation of the key SK5 corresponding to a message "OK", whereby the display changes to a state (16) in which the message "SINGLE!!" in the state (2) is replaced by a message "MULTI!!", indicating the selection of the multiple mode. Also as shown in FIG. 11C, the cassette display unit indicates the selected size A4, and, for the distinction between the single mode and the double mode, the LED's 260 normally lighted as in FIG. 11A or FIG. 11B to indicate the upper or lower cassette are both turned off in the single mode. Consequently, in this case, the upper/lower cassette selecting key 259 is disabled.

Now reference is made to Tab. 13 for explaining the functions of the reader, multi-input multi-output unit (MIMOU) and printers and the communication among these units, in an image forming operation, or copying operation, of the present system.

Figure 13B:
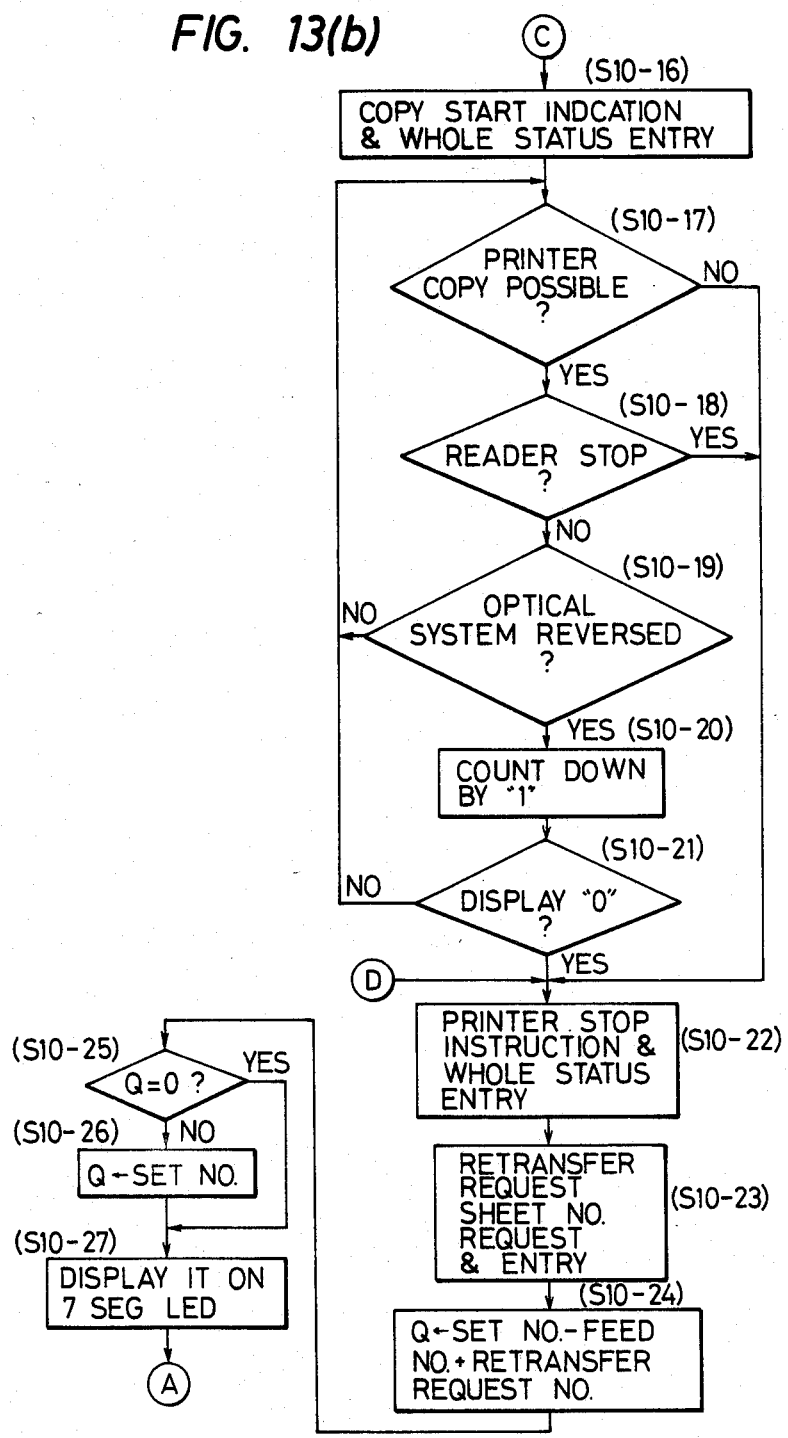

In FIG. 13, a column (A) indicates the operation and function of the readers, (B) indicates the communication between the readers and the MIMOU, (C) the function of the MIMOU, (D) the communication between the MIMOU and the printers, and (E) the function of the printers. In the present system the information exchange among various units (between reader and MIMOU and between MIMOU and printers) is principally conducted by serial signals, except the image signals.

In the serial communication between the reader and the MIMOU the reader functions as a master, while the MIMOU functions as a master in the serial communication between the MIMOU and the printers.

The master detects whether the addressee can receive the serial signals, for example by a power status signal or a reception status signal of the addressee, and, if the signals can be received, it supplies various instructions in serial codes. Upon reception of such instruction, the addressee checks parity error etc., and, if said instruction is effective, it sends back the information responding to the instruction or performs operations required by said instruction.

The communication is conducted in a 1-to-1 process in which the master sends an instruction code, called "command", and the addressee always sends back information, called "status", responding to said instruction code.

Now reference is made to FIG. 13 for explaining the procedure of communication and the function of various units.

Tab. 1 shows status requesting commands for requesting information from the printer. Upon reception of a status requesting command, the multi-input multi-output unit or the printer an 8-bit status signal responding to said status requesting command listed in Tabs. 2–11. Tab. 2 shows a command error status sent back in case the received command is inadequate, in which the 6th bit is set in case of a parity error.

Tab. 3 shows a status indicating the state of a corresponding printer in the single mode, or indicating the overall state of the usable printers and the printers in use, in case of the multiple mode. The bit "print request", which is a sheet feed enable signal, is set when all the printers in use are in a state capable of sheet feeding. The 5th bit "sheet in feeding" is set when any of the printers in use is in the course of sheet feeding. The 1st, 2nd, 3rd or 4th bit, respectively indicating "print error", "wait cycle (fixing station in heating)", "off duty (shut-off or power economization)" or "call error (operator call or serviceman call)" is set when an error occurs in any of the printers in use.

Tabs. 4 and 5 show status signals respectively indicating the details of operator call error and serviceman call error, in which each bit is set in case of an error in the corresponding driving unit or process unit.

Tab. 6 shows a status signal indicating the number of resendings which have become necessary by the print errors.

Tabs. 7 and 8 show status signals indicating the sheet sizes of the lower and upper cassettes in the corresponding printer in the single mode.

Tab. 9 shows an application status signal indicating whether a MIMOU is connected, and the 2nd bit is reset in case the printer is directly connected to the reader.

Tab. 10 shows a status signal indicating the state of the printer, in which the 6th bit "printer ready" indicates that the corresponding printer is ready for printing operation, and the 5th bit "my printer" indicates that the responding printer has an identification number same as that of the reader requesting information. The 4th, 3rd, 2nd and 1st bits respectively indicate the cassette sizes.

Tab. 11 shows a status signal indicating the number of sheets fed in a copying cycle. The bit "last sheet feed" indicates the copyings of an instructed number have been completed. The 5th bit "request resending" indicates that the resending of the image information is requested due to a jam or a print error in any of the printers in use. The number of such resendings is indicated by "number of requested resendings".

Tab. 12 shows an execution command requesting the printer to execute an operation. In response to an execution command, the MIMOU or the printer the total status signal shown in Tab. 3.

In said execution command included are (1) a copy start command requesting the printer to start the copying operation, (2) a printer stop command requesting the interruption of the copying operation, (3, 4) sheet feed commands indicating the sheet cassette in the single mode, (5) a copy number command indicating the number of copies to be made from an original, (6) a multiple mode command indicating the printers to be used in the corresponding bits of 2nd byte (printer #1 in the 1st bit, printer #2 in the 2nd bit and so on), (7) a single mode command indicating that the printer functions in the single mode, (8) a sheet size command to be released from the reader in case of the multiple mode, (9, 10) commands respectively indicating the start and stop of a shut-off state, which will be explained later, and (11) a sort mode command to be released prior to the start of the drum rotation in case the aforementioned sort mode is selected.

Now reference is made to the flow chart shown in FIG. 12, for explaining the function of the reader in the serial communication between the reader and the MIMOU utilizing the above-described commands. In the present embodiment the reader can provide the MIMOU with the status requesting command shown in Tab. 1 or the execution command shown in Tab. 12.

In a state in which the copy sequence is not in progress and there exists no key entry, a communication represented by FIG. 12(a) is conducted prior to the communication shown in Tab. 13.

At first the reader emits the application status requesting command and receives the application status signal (S16-1) to identify whether the MIMOU is connected, thereby selecting the aforementioned signal HSBD. Then, the execution command is checked as will be explained later (S16-2), if the MIMOU is connected, the reader emits the printer information requesting command 8 times corresponding to the number of possible printer connections, and receives information on which printers are in printable state, on which printers are in the single mode, and on the sheet sizes in the upper and lower cassettes of each printer (S16-4, 5). On the other hand, if the MIMOU is not connected, the reader identifies that the system is stand-alone type in which the reader is connected directly with the printer without the MIMOU, and emits the upper cassette status requesting command and the lower cassette status requesting command shown in Tab. 1, in order to know the sizes of the upper and lower cassettes (S16-6).

After the reception of the sheet size information etc. and the execution command check explained above, the entire status signal is obtained in response to the entire status requesting command shown in Tab. 1. However, since the copy sequence is not in progress in this state, the presence of a call error alone is checked by the entire status signal (S16-8). In the absence of a call error, the program returns, after the execution command check, to the request for the application status signal in the step S16-1, and the above-described cycle is thereafter repeated. Consequently the reader can confirm the system structure and the state of each unit.

In case of presence of a call error, the serviceman call error requesting command shown in Tab. 1 is emitted to obtain the details of the serviceman call error (S16-9), and the operator call error requesting command shown in Tab. 1 is then emitted to obtain the details of the operator call error (S16-10). Thereafter the program returns to the step S16-1 to repeat the same procedure.

The serial communication is conducted as explained above if the copy sequence is not in progress. In addition, execution commands shown in Tab. 12 are released according to a procedure shown in FIG. 12(b), for identifying whether such execution commands are to be preferentially released, after the entry of a status signal at the steps S16-1, S16-4, S16-6, S16-7, S16-9, S16-10 etc. as shown in FIG. 12(a).

Figure 12B:
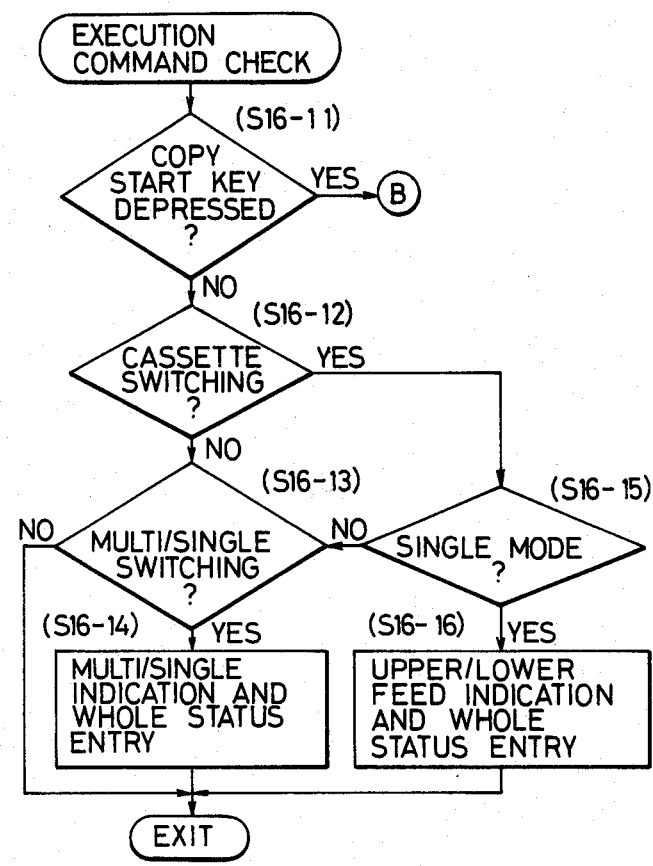

In the execution command check shown in FIG. 12(b), at first an identification is made whether the copy start key 235 is actuated (S16-11). If it is actuated, there is executed a print sequence according to a procedure shown in FIG. 13 as will be later explained more detailedly.

If the copy start key 235 has not been actuated, there is identified whether the upper/lower cassette selecting key 259 has been actuated, and whether the cassette is to be switched by the selection of the preset key or the reset key (S16-12).

If the cassette switching is necessary there is identified whether the single mode or the multiple mode is adopted (S16-15). In case of the multiple mode the switching of the upper/lower cassette is not conducted. In case of the single mode, the upper cassette sheet feeding command or the lower cassette sheet feeding command shown in Tab. 3 is emitted to receive the entire status signal (S16-16), and the normal sequence shown in FIG. 12(a) is thereafter followed. On the other hand, if the cassette switching is identified unnecessary in the step S16-12 or S16-15, there is identified whether the single or multiple mode state is changed (S16-13). In case of a change, the multiple mode command or the single mode command shown in Tab. 12 is released according to such change to receive the entire status signal (S16-14), and the normal sequence shown in FIG. 12(a) is thereafter followed. In the absence of an execution command to be released at the step S16-11, S16-12 or S16-13, the normal sequence shown in FIG. 12(a) is followed without the release of the execution command.

The communication procedure prior to the normal sequence is thus completed, thus enabling the operation shown in Tab. 13.

In the following there will be explained a communication operation during the copying sequence.

As shown in Tab. 13, in the copying operation of the multiple mode, the reader at first receives the entry of the sheet size, copy number, image forming conditions etc. from the operator, through the operation unit. Upon actuation of the copy start key, the reader transmits, to the MIMOU, the sheet size, printer numbers and number of copies through the communication procedure.

Upon reception of the sheet size, printer number and copy number, the MIMOU checks the printers connected thereto (however designated printers only in the printer designation mode), and counts the number of the operable printers provided with the designated sheet size, and calculates the number of required printers from the number of copies. After said calculation a communication is made to designate the upper or lower cassette of a required size, to the required printers.

After the instruction of the sheet size and the copy number, the reader transmits a copy start instruction to the MIMOU.

In response to said copy start instruction, the MIMOU transmits a copy start instruction to the printers which have received the cassette designation.

In response to said copy start instruction, each printer activates the relevant units, and provides the MIMOU with a signal indicating an enabled state for receiving the image signals when such state is reached.

When said signal indicating an enabled state for receiving the image signals is received from each of the printers required for printing, the MIMOU provides the reader with a signal indicating an enabled state for receiving the image signals.

In response to said signal the reader start the image reading and transmits the image signals to the MIMOU.

The MIMOU sends the image signals simultaneously to all the printers in use.

In response to said image signals, each printer performs a printing operation according to the printer procedure.

Upon completion of a copying cycle, the MIMOU provides the reader with the number of copies made in said cycle, then checks whether the number of copies has reached a number initially instructed by the reader, and, if said number is reached, transmits a signal indicating the completion of final copy to the reader.

On the other hand, if said instructed number has not been reached, the MIMOU again sets the copy start signal to the printers of a required number, and awaits that all the printers become capable of receiving the image signals.

Upon reception of the copy number from the MIMOU, the reader reduces the display of number accordingly, and, upon reception of the signal awaiting the image signals from the MIMOU, starts again the image reading of the same original. The reader repeats this operation until the final copy completion signal is received.

Upon reception of sai final copy completion signal, the reader transmits a signal for stopping the printer to the MIMOU.

Upon reception of said printer stop signal, the MIMOU transmits an instruction to stop to all the printers in use, whereupon the printers terminate the function of component units thereof.

The copying operation in the single mode, being conducted in a particular printer, is achieved through the communication (B), (3), (4), (5) and (6) shown in Tab. 13. In this case the communication relating to the printer designation and copy number counting for using plural printers are not required.

Now reference is made to FIG. 13 for explaining an example of serial communication sequence in the reader during a copy sequence.

In case the aforementioned execution command check (FIG. 12(B)) identifies that the copy start key has been actuated, there is conducted an identification whether the multiple mode is adopted (S10-1). If single mode with MIMOU or stand-alone mode without MIMOU is identified, the reader immediately releases the copy start instruction command to the MIMOU or to the printer, and receives the entire status signal (S10-16). Thereafter steps S10-17 to S10-21 to be explained later are repeated until the copying operation is completed.

There is at first identified whether the printer is capable of copying operation (S10-17), and, if it is incapable of copying operation due to the absence of copying sheet, sheet jamming or other abnormality, the printer stop command is immediately released (S10-22). If the printer is capable of copying operation, the state of the printer is then checked (S10-18). In case the copying operation is to be interrupted by the actuation of the stop key 261 or the interruption key 262, or in case the copying operation cannot be continued because of an abnormality in the reader, the printer stop command is immediately released (S10-22).

If no factor is found for interrupting or stopping the copying operation, there is identified whether the optical position is located at the reversing position (S10-19). If not, the abovementioned checking steps S10-17 and S10-18 are repeated until the optical system reaches the reversing position.

Different from the multiple mode to be explained later, in the stand-alone mode in which a reader is directly connected to the reader or in the single mode in which the reader supplies its own printer with signals through the MIMOU, a copying sheet is fed in the printer at each original scanning by the optical system of the reader (S10-19). Thus the number displayed in the set copy number indicator 255 shown in FIG. 7 is stepwise reduced when the optical system reaches the reversing position (S10-20).

If the displayed number after said reduction is not "0", namely if the number of original scannings has not reached the preset number, the program returns to the step S10-17 to continue the copying operation. On the other hand, if said displayed number reaches "0", the reader releases the printer stop command and receives the entire status signal (S10-21, S10-22).

After a series of copying cycles is completed in the normal manner, or terminated or interrupted by an abnormality, the reader emits the resending number requesting command shown in Tab. 1 to the printer or to the MIMOU and receives the number of requested resendings (S10-23). Said number is naturally zero in case of normal completion, but is equal to the number of uncompleted copies in case of abnormal termination or interruption.

Then a number Q="preset copy number"—"number of sheets fed"+"number of requested resendings" is calculated (S10-24), and, if Q=0 (S10-25) indicating that the copies of the preset number are completed, the 7-segment preset copy number display unit 255 displays the preset copy number (S10-26). On the other hand, if Q≠0, said display unit displays said number Q as the number of remaining copies (S10-27).

After the procedure of serial communication and copy number display during the copy sequence in the stand-alone mode or in the single mode is completed in this manner, the program returns to the flow shown in FIG. 12(a) to execute serial communication in a state awaiting the actuation of the copy start key.

Now there will be explained a procedure in case the multiple mode is identified in the step S10-1 shown in FIG. 13. In the multiple mode, there are emitted in succession the sheet size designation command shown in Tab. 12 (S10-2), the preset copy number command (S10-3) and the copy start command (S10-4). The multiple mode is effective, in case the image signals from the reader can be transmitted to plural printers through the MIMOU, for (A) manually selecting from the reader, a particular printer meeting the required conditions such as the location, copying speed, toner color, mounted cassette size, ability for two-side copying etc., (B) manually selecting plural printers meeting the above-mentioned conditions, and (C) automatically selecting, by the MIMOU, one or plural printers meeting the above-mentioned conditions. In the following description emphasis will be given to the case (C) in which the cases (A) and (B) are included. Since the copy number control is conducted by the MIMOU in the multiple mode, the reader transmits the preset copy number to the MIMOU and the original scanning of the optical system is controlled on the basis of information supplied from the MIMOU.

After the copy start command is emitted in the step S10-4 shown in FIG. 13, the reader executes the serial communication sequence in the multiple mode explained in the following.

At first there is identified whether at least one of the printers designated as addressees at the start of copying operation is capable of copying operation (S10-5). If all the printers become unavailable for copying operation due to some reason or if the MIMOU shows an abnormality, there is emitted the printer stop command (S10-22).

On the other hand, if at least a printer is capable of copying operation, there is identified whether the reader has any reason to interrupt or terminate the copying operation (S10-6). In case of an abnormality in the reader or in case the stop key 261 or the interruption key 262 has been actuated, the printer stop command is released (S10-22).

If no factor for terminating or interrupting the copying operation in the printer or in the reader, there is identified whether the optical system of the reader has reached the reversing position after the original scanning (S10-7). If not the program returns to the step S10-5. Upon arrival at the reversing position, the sheet feed number requesting command shown in Tab. 1 is emitted to obtain the information on the number of sheet feedings, whether the final sheet feeding is reached, and whether the request for resending exists due to sheet jamming or the like (S10-8).

Different from the single mode, the reader basically need not know which printers or how many printers will be used for printing. Also even if a part of the printers fails, the MIMOU appropriately allots the copying operations until the copies of the preset number are obtained. Thus after each original scanning by the optical system, the reader asks to the MIMOU how many sheets have been fed in said scanning, and displays a number of remaining copying operations which is obtained by subtracting the number obtained in the step S10-8 from the number displayed on the copy number display unit 255 (S10-9). Then identified is whether the newly displayed number is zero (S10-10). If not zero, namely if there are still some sheets left to be fed, there is checked whether a resending request flag, in the sheet feed number status signal obtained in the step S10-8, is set (S10-14).

If there is no request for resending, the program returns to the step S10-5. On the other hand, if there is a request for resending, the requested resending number requesting command shown in Tab. 1 is emitted to the MIMOU to obtain the number of requested resendings, and the program then returns to the step S10-5.

If the display reaches zero at the step S10-10 in FIG. 13, there is checked whether a final sheet feed flag, in the sheet feed number status signal obtained in the step S10-8, is set (S10-11).

When the display is zero, indicating that the sheet feedings of the preset number have been comleted, and the final sheet feeding is indicated by the MIMOU, the reader recognizes that the copying operation is completed in normal manner and releases the printer stop command (S17-22). In case some of the printers which are initially designated as addressees at the start of copying operation become unable to continue the copying operation due to sheet jamming or the like, some of the sheets fed in such printers do not bear image in normal manner. In such case, the step S10-10 identifies the sheet feedings have been effected in the preset number but the step S10-11 identifies that the final sheet feeding is not reached. Thus the number of requested resendings, obtained in the steps S10-14 and S10-15 is displayed on the display unit 255, and the program returns to the step S10-5.

However, in case of the sorting mode, the above-described automatic correction is not conducted and the printing operation is disabled if the failure occurs even in a printer.

Also the printer stop command is emitted (S10-22) if the copies of the present number are obtained, or if all the printers initially designated as the addressees fail, or if the reader rails, or if the stop key or the interruption key is actuated. Then the steps S10-23 to S10-27 are executed in the same manner as in the single mode, and the program returns to the flow shown in FIG. 12(a).

Figure 14A:
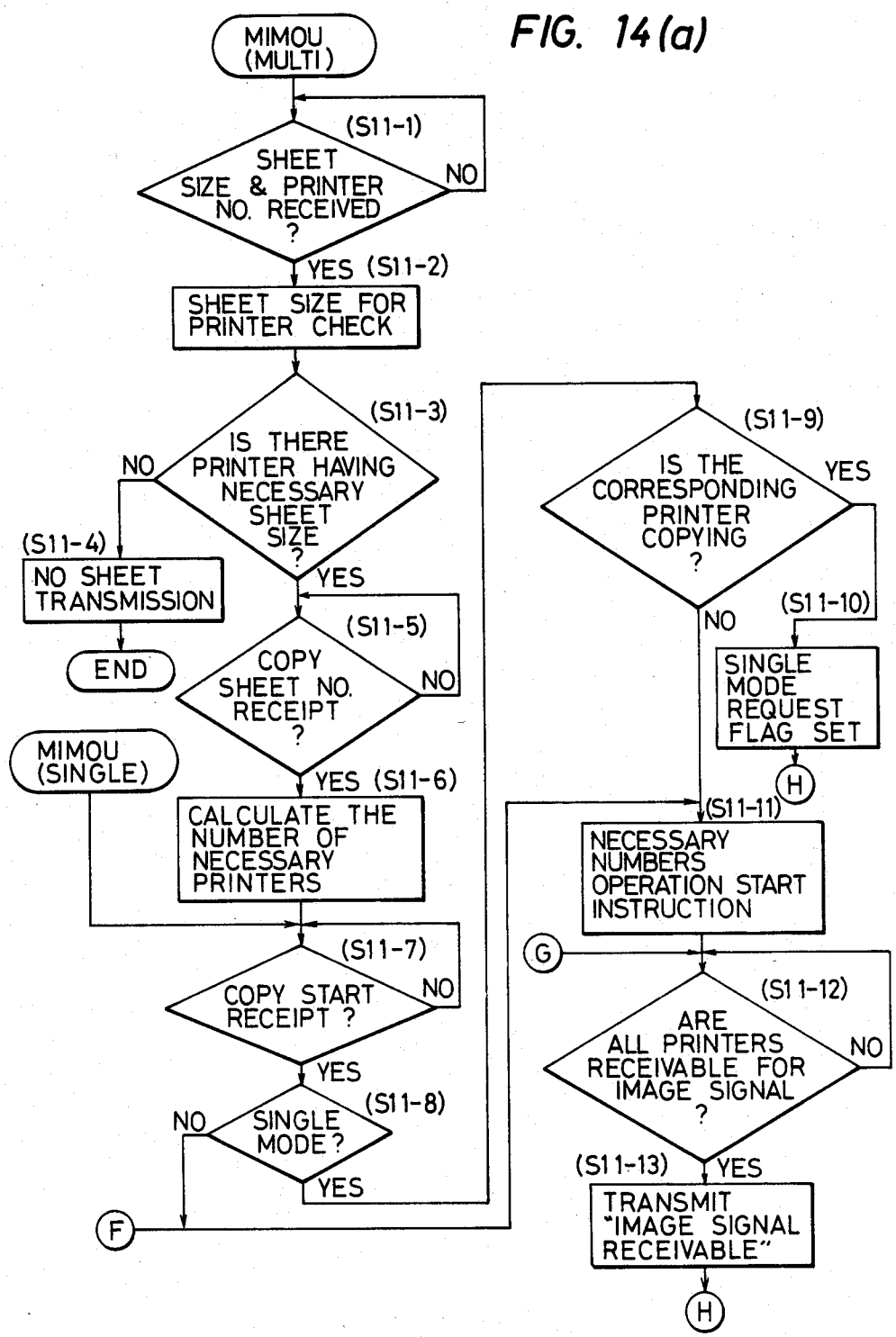
FIGS. 14(a) and 14(b) are flow charts of a program to be executed, at the copying operation, by a microcomputer in the multi-input multi-output apparatus
Figure 14B:
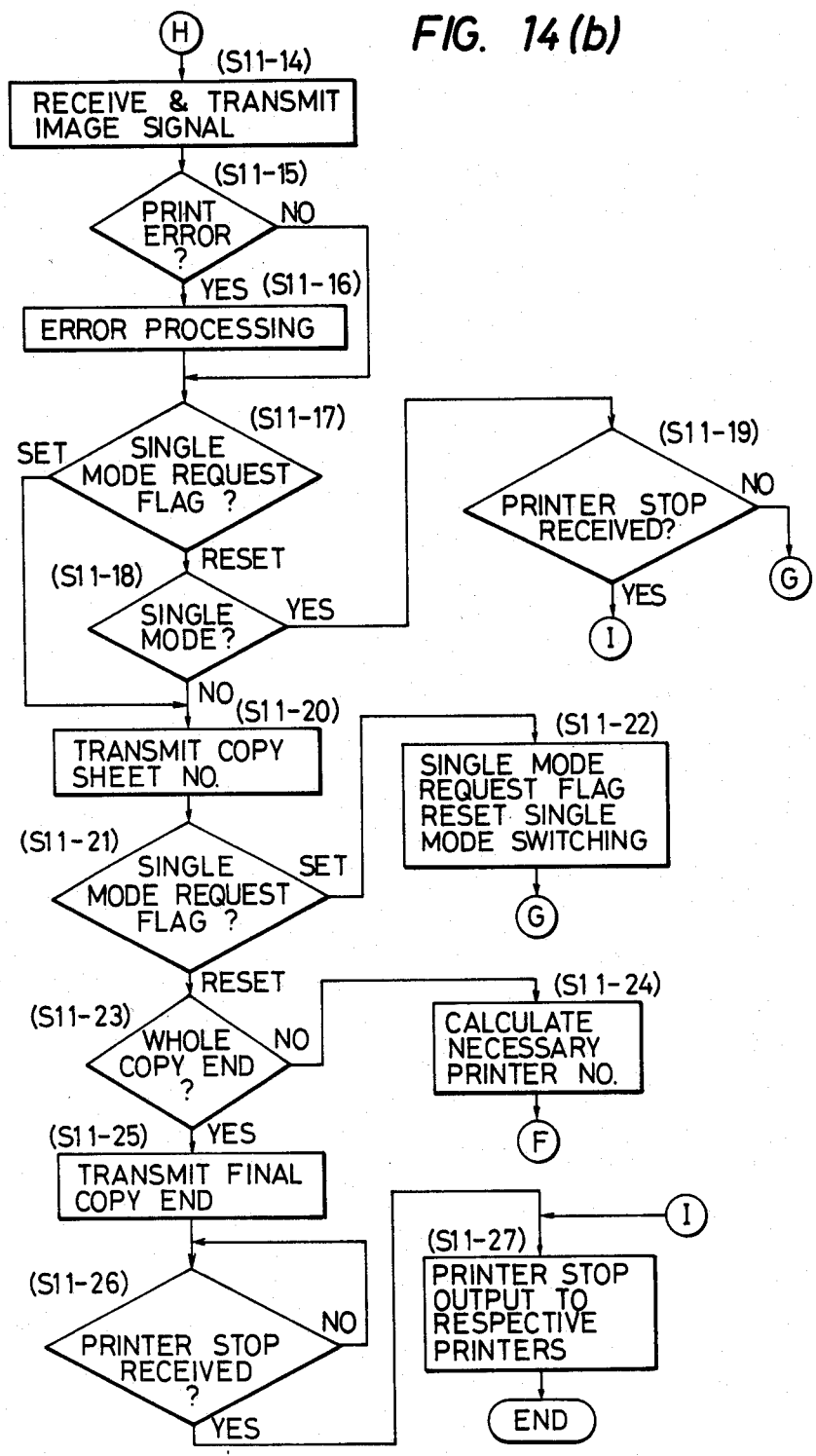

FIG. 14 shows the function of the micro- computer of the MIMOU in the image forming operation shown in Tab. 13, wherein the sequence starts from a step S11-1 in the multiple mode while that starts from a step S11-7 in the single mode. In case of the multiple mode, upon reception of the sheet size and the printer numbers from the reader through the communication procedure, there is checked the sheet sizes of the printers (S11-1, S11-2). In these steps only the designated printers are checked in a mode with printer designation, while all the printers are checked in a mode without printer designation.

In the present system the MIMOU and printers exchange various information from time to time through the communication procedure, and such information is stored in a random access memory (RAM) and renewed. Consequently the sheet sizes of the printers can be checked from said information. If the instructed sheet size is not available in any of the available printers, a signal indicating absence of sheet is transmitted to the reader (S11-3, S11-4).

If a printer with the sheet of required size is connected, the information on the copy number is received (S11-5).

Then the copy number thus received is compared with the number of printers having the sheets of required size to calculate the necessary number of the printers for the copying operation (S11-6). In this step the printers already in use are considered unavailable and subtracted from the number of the printers used for said comparison.

Upon reception of the copy start signal from the reader, the MIMOU instructs the printers, corresponding to thus calculated number, to initiate the copying operation (S11-7, S11-11). In the single mode, however, said instruction is given to a particular printer. If said particular printer is already in use by another reader in the multiple mode, no immediate switching to the single mode is effected but a single mode requesting flag is set to await the completion of a copying cycle in progress (S11-9, S11-10).

When all the designated printers start the copying operation and emit signals that the image signals are receivable, the MIMOU transmits the image signal receivable signal to the reader (S11-12, S11-13).

The image signals received from the reader are simultaneously supplied, without going through the microcomputer, to the printers (S11-14). Thus each printer performs the copying operation, while the MIMOU inspects copy errors in the printers, calculated the number of copies and transmits the same to the reader (S11-15, S11-16, S11-20). In the single mode, however, the copying operation is repeated until the printer stop command is received (S11-19).

In case the single mode requesting flag is set by a copy demand of the single mode during the course of the copying operation in the multiple mode, the MIMOU switches the corresponding printer to the single mode when a copying cycle thereof is completed (S11-21, S11-22). Consequently said printer performs, from the next copying cycle, the copying operation of the single mode by receiving the image signals from a reader in the single mode.

For the reader in the multiple mode, the number of the completed copies is compared with the preset copy number initially transmitted from the reader, and, if the latter number has not been reached, the number of required printers is calculated again and the copying operation is resumed (S11-23, S11-24). In said calculation the printer which has been switched to the single mode as explained above is excluded from the number of the available printers.

Upon completion of the initially preset number, a final copy completion signal is transmitted to the reader. Then, in response to the printer stop command from the reader, the MIMOU transmits the printer stop signal to all the printers, thus terminating the copying operation (S11-25, S11-26, S11-27).

Figure 15:
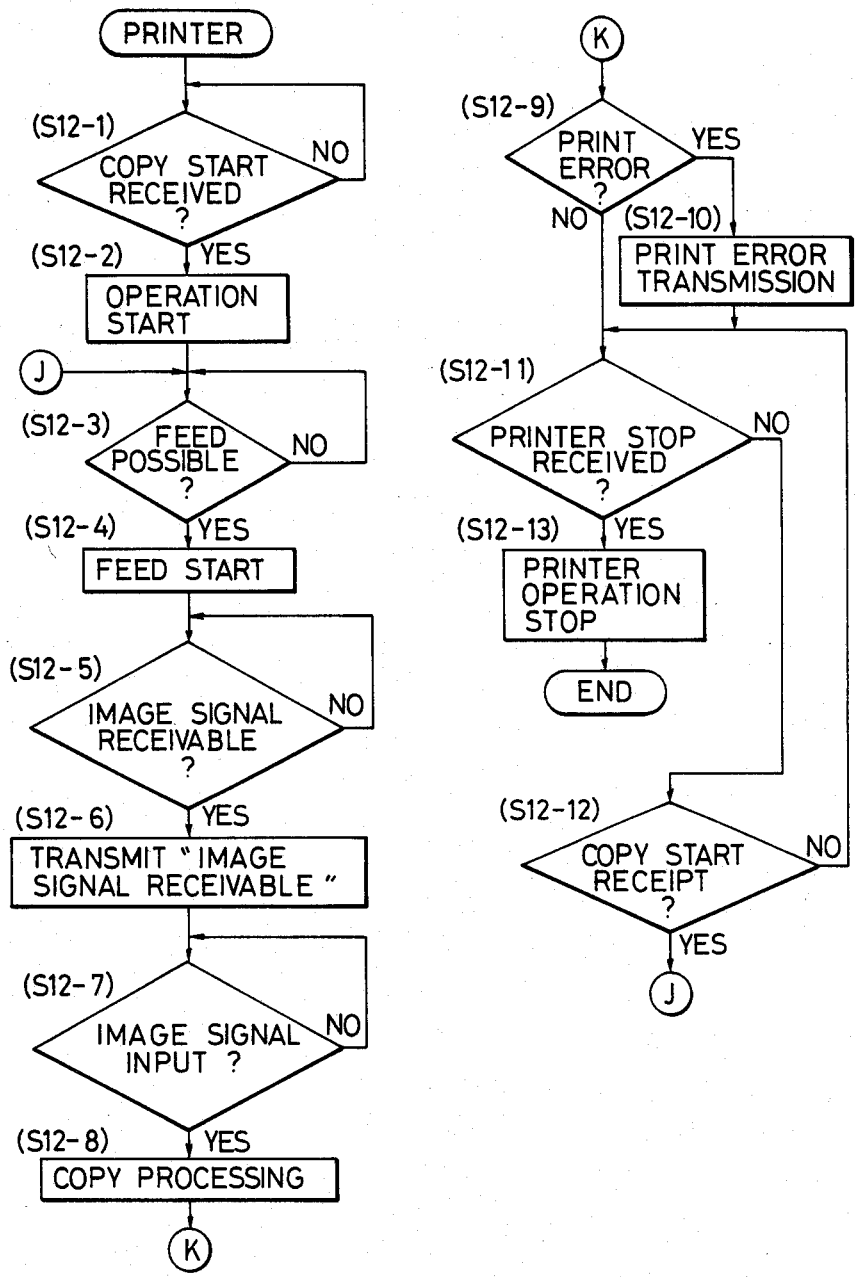
FIG. 15 is a flow chart of a program to be executed, at the copying operation, by a microcomputer of the printer.

FIG. 15 shows the function of the microcomputer of the printer in the image forming operation shown in Tab. 13. Upon receipt of the copy start command from the MIMOU, the printer activates various units according the predetermined sequence (S12-2).

As the present system employs an electrostatic recording drum printer as explained before, there are required certain preliminary steps such as drum charging. Consequently the microcomputer awaits until the preliminary steps are completed, and, then the sheet feeding is started from a cassette designated by the MIMOU prior to the start of the copying operation (S12-3, S12-4).

The microcomputer awaits until the fed sheet arrives at a position for receiving the image signals (S12-5), and, upon arrival of the sheet at said position, furnishes the MIMOU with a signal indicating an image signal receivable state (S12-6).

When the image signals are entered, there is conducted a series of copying operation including the steps of image development, image transfer onto the sheet and sheet discharge from the printer (S12-7, S12-8).

Then the microcomputer detects whether an error has occurred in said steps of copying operation, and furnishes the MIMOU wih information on said detection (S12-9, S12-10).

When the printer stop signal is subsequently received, the microcomputer terminates the function of various unit, thus completing the steps of copying operation (S12-11, S12-13). Also in response to a new copy start signal, a succeeding copying operation is started (S12-12).

Figure 16A:
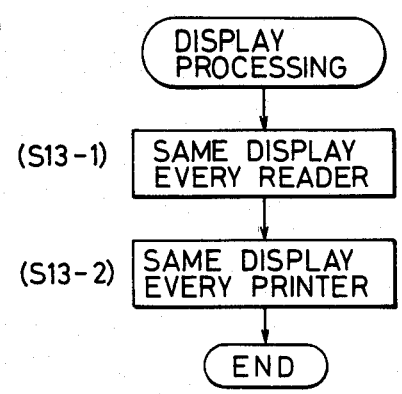
FIGS. 16(a), 16(b) and 16(c) are flow charts of a program to be executed, at the operation and display of the apparatus, by a microcomputer of the multi-input multi-output apparatus.
Figure 16B:
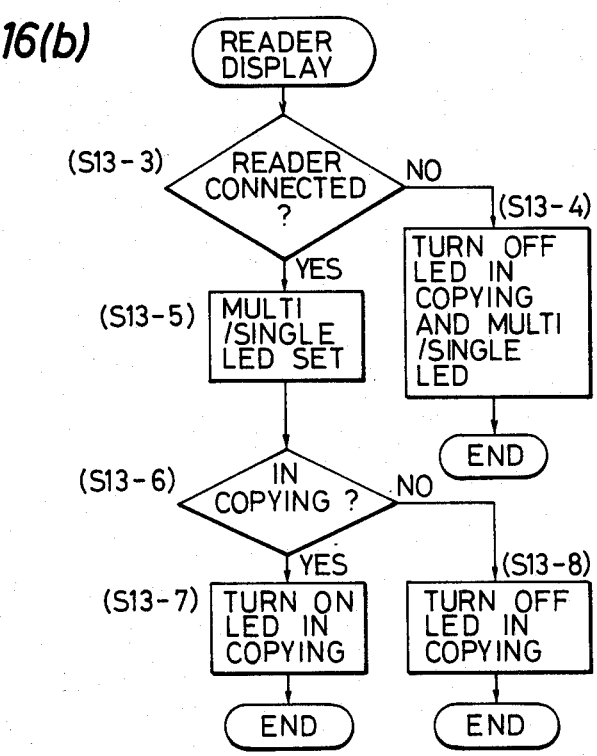
Figure 16C:
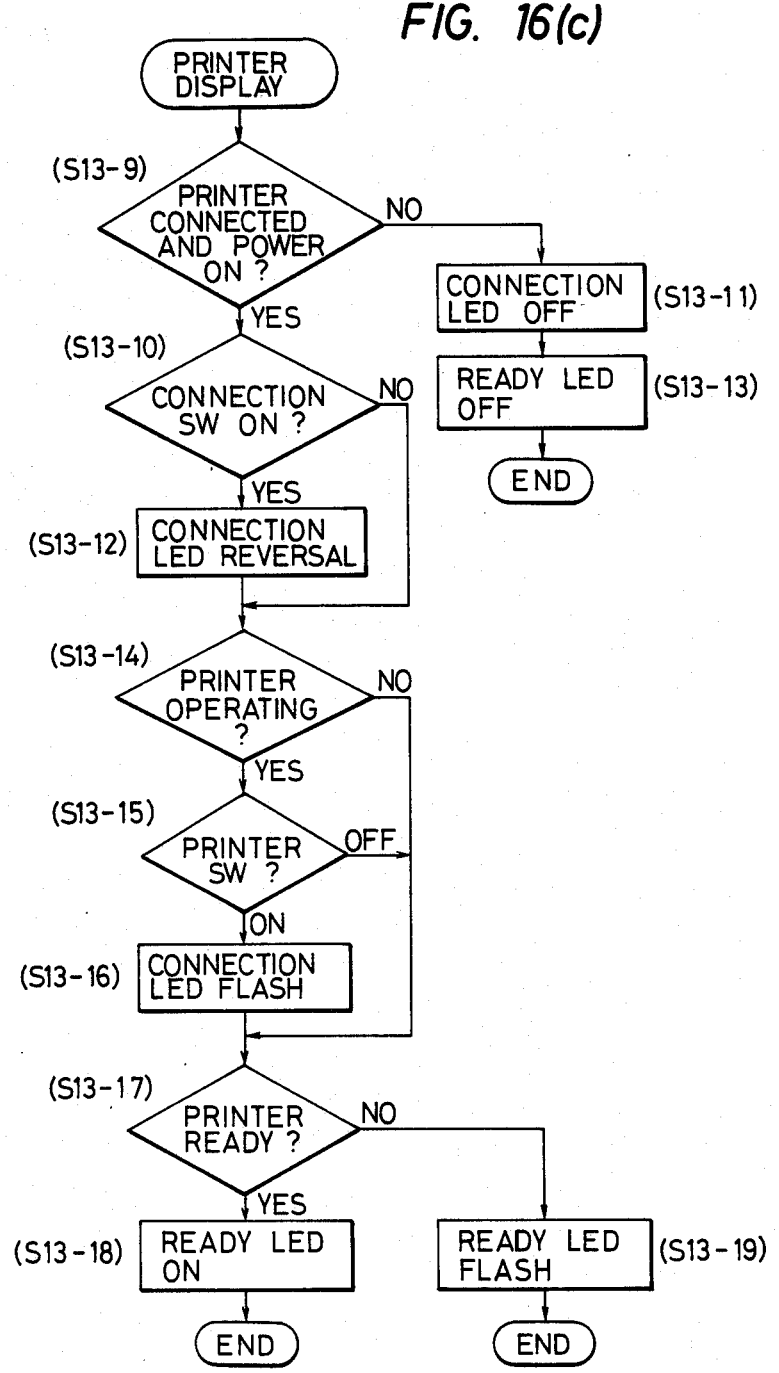

FIG. 16 shows the function of a microcomputer controlling the operation unit of the MIMOU shown in FIG. 8. The flow is divided into a display routine for each reader (S13-1) and a display routine for each printer (S13-2), and repeats the same display routine for four readers and the same display routine for eight printers.

In the process for readers, as shown in FIG. 16 (b), there is at first detected whether each reader is connected to the MIMOU. If the reader is not connected or is not powered, those of the MULTI/SINGLE LED's 303–306 and of the COPYING LED's 307–310 corresponding to the reader are extinguished (S13-3, S13-4).

Then the MULTI/SINGLE LED's 303–306 are respectively turned on or off according to the instruction from the readers (S13-5). Then the COPYING LED's 307–310 are respectively turned on (S13-7) or off (S13-8) respectively if the readers are in a copying operation or not.

In the process for the printers, as shown in FIG. 16 (c), there is at first detected whether each printer is connected to the MIMOU and powered (S13-9). If it is not connected or not powered, those of the CONNECTION LED's 323–330 and the READY LED's 331–338 corresponding to the printer are turned off (S13-11, S13-13).

If the printer is connected and powered, there is detected the actuation of the CONNECTION switches 315–322 (S13-10), and, if actuated, the corresponding ones of the CONNECTION LED's 323–330 are inverted. Thus the connected and unconnected states are changed alternately upon each actuation of the switch (S13-12).

In case the printer is in operation and one of the OPERATING PRINTER switches 311–314 corresponding to the reader emitting the image signals is actuated, a corresponding one of the CONNECTION LED's is caused to blink (S13-14, S13-15, S13-16).

Then, in case of an error in the printers, a corresponding READY LED of 331–338 is caused to blink (S13-17, S13-19), and if the printer is ready for printing, the corresponding READY LED is lighted (S13-18).

FIG. 17-1 (a) shows the details of the error processing (ERROR PROCESSING 1) shown in FIG. 14.

In case of an error in the single mode, there is checked whether another printer is operable and is not used by other readers. If an operable printer is available and is equipped with a cassette of required size (S17-1, S17-5, S17-8), a printer switching process (internal flag setting etc.) is conducted (S17-9) and a start instruction is supplied to the printer to be newly employed (S17-10). If no operable printer is available in case of an error in the single mode, or if all the printers in use have errors in the multiple mode, or if any of the printer in the sorting mode has an error, the error situation received from the printer is set in the error bit of the status signals (S17-8, S17-3, S17-2, S17-4), and a ready signal is reset (S17-11) to inform that the printing operation cannot be continued. The ready signal indicates whether the printing operation is possible or not and is supplied to the readers, MIMOU and printers.

In case the printer is switched to another operable printer in the step S17-9, the error information of the printer that has been used before is not transmitted to the reader since the printing operation is rendered possible. Also since such error will not be frequent, the fact of switching the printer is not transmitted to the reader in the present embodiment. This procedure is cancelled simultaneously with the printer stop signal at the end of the copying operation. Thus, in the normal communication in the single mode thereafter, the error of the printer is transmitted and displayed in the reader, so that the succeeding copying operation cannot be started by the program of the reader explained in relation to FIG. 13, unless said error is resolved.

On the other hand, if not all the printers have errors in the multiple mode other than the sorting mode, there is checked whether a request for resending has been generated (S17-6), and, if such request exists, there are set the resending requesting flag of the sheet feed number status and the requested resending number status (S17-7).

In case an error occurs in one of the plural printers in the course of a copying operation in the multiple mode other than the sorting mode, the copying operation is completed by suitably dividing the remaining copyings and requested resendings among the remaining printers. More specifically, in such case, the number of required printers is reduced by the number of the failed printers, and the number of image readings increases correspondingly.

FIG. 17-1 (b) shows a flow ERROR PROCESSING 2 for use by the MIMOU after the completion of a copying operation, for providing the reader with information on errors in the printers employed in said copying operation, in case of the multiple mode. In case of the single mode, the error information of a particular printer is transmitted to and displayed in the reader until said error is resolved in the printer.

In this case it is assuemd that the communication with the reader and with the printer is conducted respectively in normal manner.

When the copying operation is completed by the printer stop signal (S17-12), the MIMOU checks all the printers in use, and, in case of sorting mode, sets the error flag in each status. On the other hand, in the non-sorting mode, the error information is not transmitted unless errors are found in all the printers, and the error flag is set in each status signal in case errors are found in all the printers (S17-13, S17-14, S17-15). Then the information is transmitted for 5 seconds (S17-16), and, if another unused printer is available or the error of any failed printer is resolved to provide at least an operable printer, error flag in each status signal is set and the ready signal is set, indicating that the copying operation is enabled (S17-17, S17-18, S17-19).

FIG. 17-2 shows a flow chart of an error process in the reader. In case of an abnormality in the MIMOU or the printers during a copying operation, the ready signal is reset as shown in FIG. 17-1 (a), so that the reader supplies the printer stop signal (S17-20, S17-21, S17-22).

Then, in case of the single mode, the single mode error flag is set (S17-23, S17-24), and the error is displayed (S17-25, S17-26). Said single mode error flag is retained until the error in the single mode printer (printer of the same identification number) is resolved (S17-27, S17-28, S17-30). Thus, if the single mode error flag is set, the error in the single mode printer is displayed even in the multiple mode or during a copying operation (S17-27, S17-28, S17-29).

As explained in the foregoing, if an error occurs during a copying operation in the single mode, the copying with the multiple mode is rendered possible by the aforementioned error processing (FIG. 17-1 (a)) in the MIMOU as long as another operable printer is available. However the error which has occurred in the single mode continued to be displayed until said error is resolved.

In the following there will be explained various copy modes and error displays in the operation unit of the reader for various error situations in case three readers are connected with three printers through the MIMOU.

FIG. 18-1 shows a case of multiple mode operation for transmission from the reader #1 to the printers #1, #2, #3, in which the printer #3 is stopped by an error before the copies of the present number are obtained, so that the remaining copies are prepared by the remaining two printers #1 and #2.

If the sorting mode is not employed in this case, the MIMOU does not reset the ready signal to the reader #1 nor sets the error flag through the error processing #1 shown in FIG. 17-1 (a) since not all the printers designated by the reader #1 have caused errors. Consequently the reader #1 performs no error display during the copying operation or there after through the error processing #3 shown in FIG. 17-2.

FIG. 18-2 shows a case of multiple mode operation for transmission from the reader #1 to the printers, #1, #2, #3, in which all the printers are stopped by errors before the copies of the present number are obtained.

In this case the MIMOU sets the error flag and resets the ready signal through the error processing #1 shown in FIG. 17-1 (a), since all the printers designated by the reader #1 have caused errors. Consequently the reader #1 emits the printer stop command through the error processing #3 shown in FIG. 17-2.

Upon reception of said printer stop command in the step S17-11 in the error processing #2 shown in FIG. 17-1 (b), the MIMOU sets the error flag according to the status of said errors since all the printers in use have caused errors. The reader #1 performs an error display according to said error flag in the error processing #3 shown in FIG. 17-2.

The error display in the reader #1 continues until at least a printer becomes available, since the MIMO does not reset the error flag in the error processing #2 until any of the printers #1, #2 and #3 becomes operable again.

FIG. 18-3 shows a case of multiple mode operation for transmission from the reader #1 to the printers #2, in which the printer #2 causes an error before the copies of the present number are obtained. In this case the MIMOU resets the ready signal through the error processing #1 while the reader #1 emits the printer stop command through the error processing #3, and, upon reception of said command in the error processing #2, the MIMOU identifies that all the printers (printer #2 in this case) have caused errors (S17-12) and sets the error flag (S17-14). Then, after a period of 5 seconds (S17-14), the error flag is reset since the printers #1, #3 are operable. Consequently the reader #1 performs the error display corresponding to the status of the error, only for 5 seconds corresponding to the presence of the error flag, after the emission of the printer stop command.

FIG. 18-4 shows a case of multiple mode operation for transmission from the reader #1 to the printer #2, in which the printer #2 is stopped by an error before the copies of the preset number are obtained and the copying operation cannot be continued since the remaining printers #1, #3 are also in failed state. In this case the error display is performed in the reader #1, as in the case of FIG. 18-2, until one of the printers becomes available.

The above-described error display process allows to use the ordinary error display unit for various output modes and enables operation with same feeling while distinguishing the display in such case from that in the ordinary stand-alone or single mode.

Figure 19A:
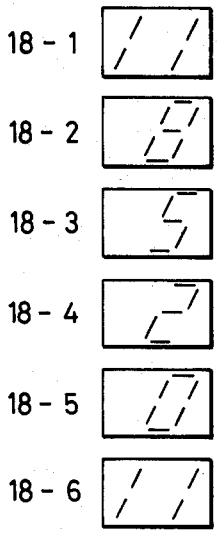
FIGS. 19(a) and 19(b) are views showing examples of display of copy number in the operation unit of the reader.
Figure 19B:
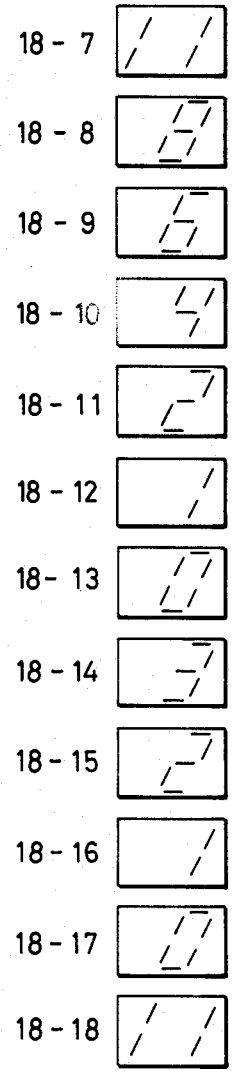

Now reference is made to FIG. 19 for explaining the copy number display in the operation unit of the reader in the multiple mode.

(a) shows the example of display in case of making 11 copies with three printers, and at first, prior to the actuation of the copy start key 253, there is displayed the copy number "11" preset by the numeral keys 254 or registered in a preset mode and recalled by one of the preset keys 251 (S18-1).

Upon subsequent actuation of the copy start key 253, the reader performs serial communication with the MIMOU through the aforementioned procedure to start the copying operation. In case all the printers and the reader are in the normal state and neither the stop key nor the interruption key is actuated, the total number of sheets supplied in the three printers at each original scanning of the optical system is transmitted from the MIMOU to the reader through the serial communication and is subtracted from the displayed number, so that the display in succession changes to "8", (S18-2), then to "5" (S18-3) and to "2" (S18-4)

When the number of the remaining copies becomes "2", one of the original functioning three printers becomes unnecessary. Consequently the MIMOU sends the printer stop command to arbitary one of the printers, such detaching said printer from the copying sequence. When the optical system reaches the reversing position in the original scanning in the succeeding copying cycle, the number of sheets supplied in the remaining two printers is transmitted from the MIMOU so that the displayed number "2" (S18-4) is reduced to "0" (S18-5). Since the printers are in the normal state, and there is no factor in the reader to terminate or interrupt the copying operation, the aforementioned resending request flag is not set. Also the final sheet feed flag is set when the above-mentioned sheet supply number "2" is received. Thus the above-described copying sequence is identified as normally terminated, so that a number "0" is once displayed and then the preset number "11" is displayed again for the next copying operation (S18-6).

FIG. 19 (b) shows an example of the copy number display in case of a non-sorting multiple mode copying with three printers in which two printers failed in the course of the copying operation, at first by the absence of sheets in a printer and then by sheet jamming in another.

At first the preset number "11" is displayed (S18-7), and sheets are supplied in all the three printers to perform a copying cycle, whereby the display is changed to "8" (S18-8). It is assumed that one of the printers runs out of the stock of the recording sheets. For the succeeding original scanning, therefore, two printers become available to prepare two copies, whereby the display is changed "6" (S18-9). After another original scanning, the display is changed to "4" (S18-10). It is assumed that one of the two printers causes sheet jamming in the sheet feeding for the next original scanning. In this case the display is once reduced from "4" to "2" (S18-11).

In this state, however, the resending request flag is set in the aforementioned sheet feeding number status signal, since the jammed printer contains three sheets which have been fed but not discharged therefrom in the normal manner. The number of requested resendings ("3") is obtained in response to the requested rending number requesting command and is retained until the final sheet feed flag is set.

After the aforementioned display "2" is obtained, there remains only one operable printer, which has to be used for completing the copying operation. Consequently the displayed number is successively reduced for each original scanning to "1" (S18-12) and to "0" (S18-13). As already explained in relation to FIG. 17, there is checked, when the display reaches "0", whether the final sheet feed flag is set in the sheet feeding number status signal (S17-11).

In the present example the final sheet flag is not set since one of the printers has caused sheet jamming in the course of the copying operation. Therefore the number of requesting resendings is checked (S17-12), and is displayed as "3" (S17-13, S18-14). Thereafter only one operable printer is used for obtaining one copy for each original scanning, so that the display changes in succession to "2" (S18-15), then "1" (S18-16) and "0" (S18-17), thus obtaining three copies. The copying operation for the preset copy number is completed, and the preset number "11" is displayed again (S18-18).

In the foregoing embodiment the image signals are obtained by reading an original, but they can also be obtained from an image file or the like utilizing magnetic or optical memory. Also the image forming unit need not necessarily be limited to the printers but may be composed of the above-mentioned image file or various displays.

Also the entire system can be expanded by connecting the MIMOU for example with a telephone line.

Now there will be given an explanation on a shut-off function attached to the present system for turning off the power supply for safety and for economization in case the system is not used for a determined period.

In the present embodiment, if no key actuation takes place for 2 hours after a key actuation in the reader, the above-mentioned shut-off function is triggered by the aforementioned shut-off start command generated by the reader. In this state the reader turns off the display, and, in response to the shut-off command, the printers turn off the power supply except that to the microcomputer.

In the present system plural readers and plural printers are mutually connected through the MIMOU, and the shut-off start command generated from a reader is basically transmitted only to a printer of the same identification number through the MIMOU. However, if the number of the printers connected to the MIMOU is different from that of the readers, and, particularly if the former is larger, some printers do not have the corresponding readers and receive the shut-off start command from the MIMOU.

More specifically, in case all the readers connected to the MIMOU are shut off, the MIMOU transmits the shut-off start command to all the printers having no corresponding readers, whereby all the readers and all the printers enter the shut-off state. Upon actuation of any key in the reader, it emits the shut-off stop command to terminate the shut-off state and returns the display to the normal state. In response to said shut-off stop command, the printer turns on the entire power supply, and enters the ordinary operative state. Similar to the shut-off start command, the shut-off stop command is transmitted from a reader to a printer of the same identification number through the MIMOU. The printers having no corresponding readers are controlled by the MIMOU, which supplies the shut-off stop command to such printers when the shut-off stop command is received from any of the readers.

Figures 1, 20:
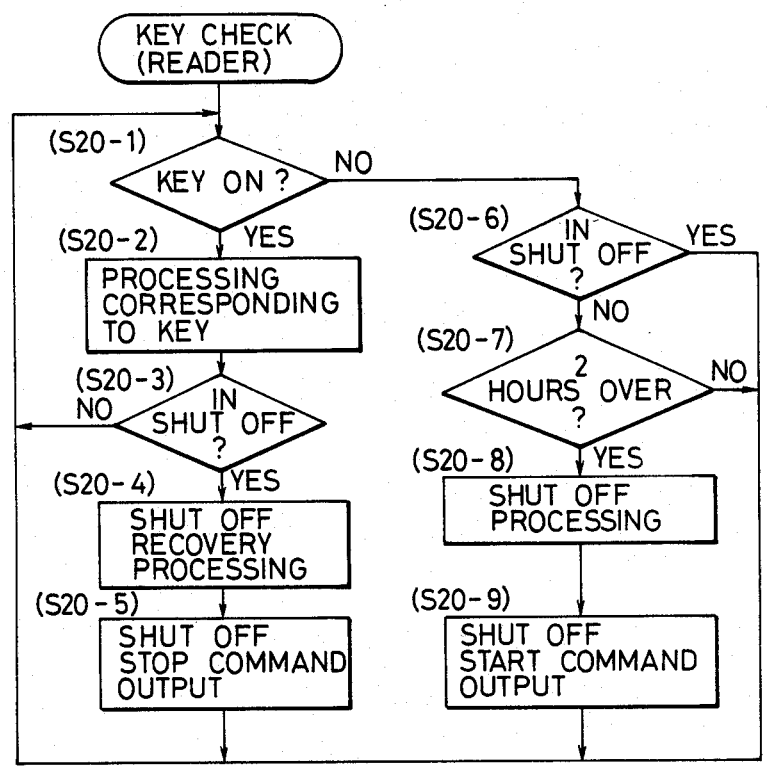
Figures 2A, 20:
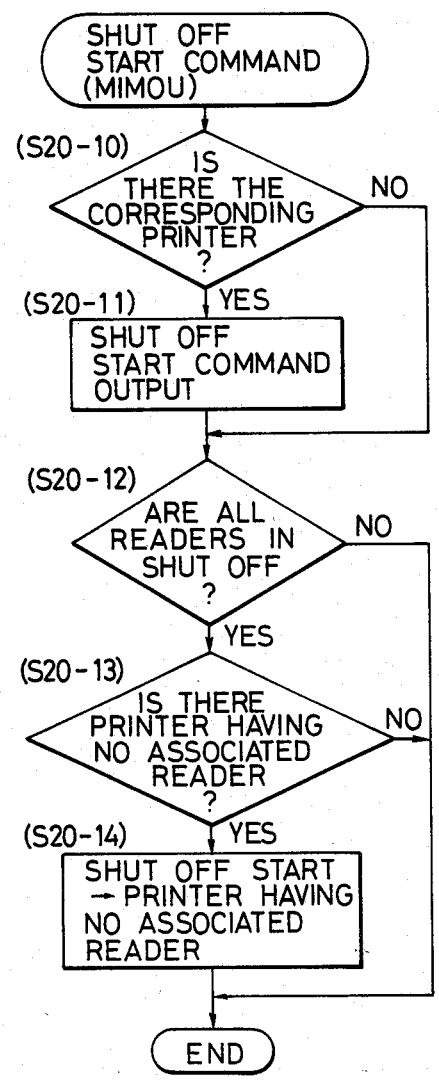
Figures 2B, 20:
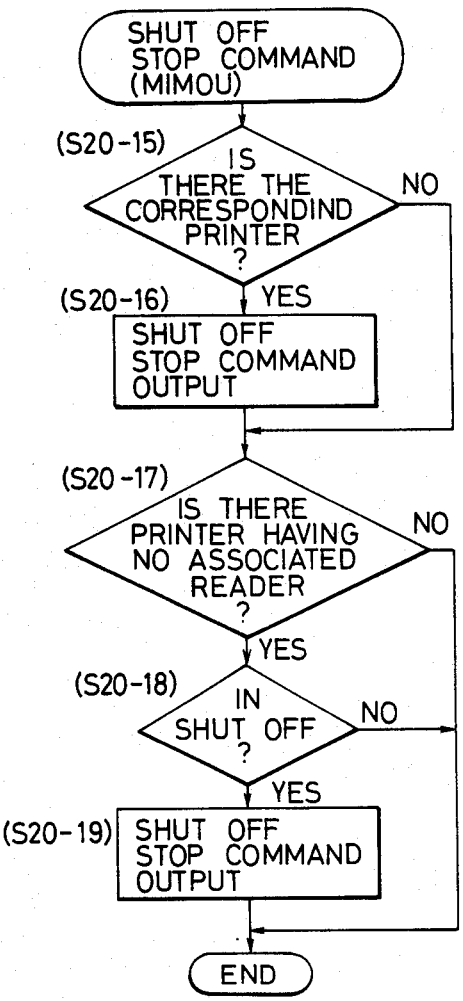
Figures 3A, 20:
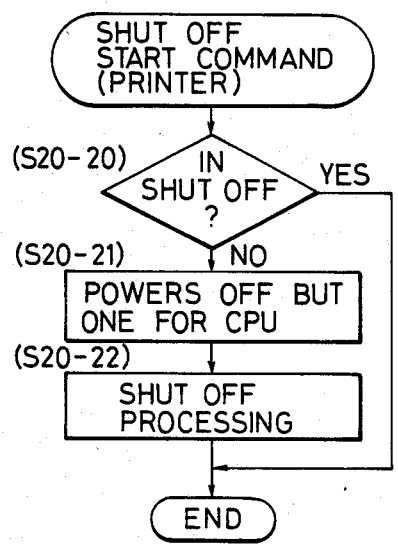
Figures 3B, 20:
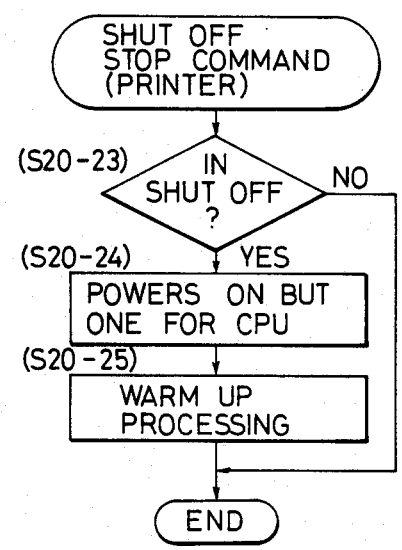

FIGS. 20-1, 20-2 and 20-3 show flow charts of the microcomputer in the shut-off function in various units. FIG. 20-1 shows a shut-off start-stop routine which is executed in the key check routine.

In case no key actuation takes place for 2 hours and the shut-off state has not been started (S20-1, S20-6, S20-7), a shut-off process such as turning off the display etc. is executed (S20-8) and the shut-off command is supplied to the MIMOU (S20-9). On the other hand, in response to a key actuation, there is executed a process corresponding to said key (S20-2), then, if the shut-off state is already established (S20-3), a process for terminating the shut-off state such as turning on of the display (S20-4), and the shut-off stop command is supplied to the MIMOU (S20-5).

FIG. 20-2 shows a flow chart for the microcomputer of the MIMOU in response to the shut-off start command (a) or the shut-off stop command (b). In response to the shut-off start command supplied from a reader, the MIMOU supplies the shut-off start command to a printer, if any, corresponding to said reader (S20-10, S20-11), then checks if all the connected readers are in the shut-off state (S20-12), and, if so, supplies the shut-off start command to the printers having no corresponding readers (S20-13, S20-14).

Also in response to the shut-off stop command supplied from a reader, the MIMOU supplies the shut-off stop command to the corresponding printer, if any (S20-15, S20-16) and also to the printers having no corresponding reader if they are in the shut-off state (S20-17, S20-18, S20-19).

FIG. 20-3 shows a flow chart of the microcomputer of the printer in response to the shut-off start command or the shut-off stop command. In response to the shut-off start command, as shown in (a), the printer turns of the power supply except that to the microcomputer, and executes a shut-off process such as turning off the display (S20-20, S20-21, S20-22). In response to the shut-off stop command, as shown in (b), the microcomputer turns on the power supply for the units other than the microcomputer which is constantly powered, and executes a warm-up process such as temperature control of the fixing station (S20-23, S20-24, S20-25). In the foregoing embodiment the shut-off function is applied to the entire system, but a similar control is applicable also to the shut-off function for a particular unit such as the pre-heating unit.

As explained in the foregoing, the present invention enables to efficiently process the entered image signals, thereby contributing the improvement in the efficiency in offices.

Also even in case of an error in the simultaneously functioning image forming units, the image forming operation can be continued without affecting the image signal output unit or other normal image forming units connected thereto.

Also the use of synchronizing means as a separate unit allows to modify the system structure according to the number of image forming units to be connected.

Furthermore the synchronizing unit may be provided with a selector for selecting the image signals from plural signal output units, thereby allowing to connect the image forming units with an arbitrary signal output unit.

Furthermore the hardware can be made compact when the number of the signal output units is less than that of the image forming units.

Furthermore the transmission efficiency in the system can be improved by the use of image signals subjected to suitable compression.

Furthermore an input-output unit is connected to plural signal output units and to plural image forming units to enable simultaneous supply of the image signals to plural image forming units, thereby enabling high-speed operation even with image forming units of lower speed.

Also the use of mutually connected plural signal output units and image forming units allows immediate replacement in case some of the units are not available due to failure or for maintenance, thus reducing the possibility of complete inability for copying operation, and improving the efficiency and reliability of the system.

The image forming unit can be shifted to the unconnected state for maintenance or inspection while it is connected to the input-output unit, and can avoid the danger of being erroneously activated by the signal output unit during such maintenance or inspection.

The signal output unit can be made versatile, not requiring particular device for connection, through automatic switching between the external and internal synchronizing signals according to the nature of the device to be connected.

Also the burden of controlling the image formation in the signal output unit can be reduced by transmitting the preset number of entire image formations from the signal output unit to the input-output unit prior to said image formation, and transmitting the number of images obtained to the signal output unit at each imaging cycle. Furthermore the communication with the signal output unit can be reduced since the information on the image forming units need not be directly transmitted to the signal output unit.

Furthermore the input-output control unit controls the number of copies, thus realizing flexibility to the change of copy number resulting from failures in the signal output unit during image forming operation.

Furthermore sheet size selection according to the image forming mode reduces the burden of the operator and facilitates the operation thereof.

Particularly if one of plural image forming units in operation becomes inoperable due to sheet jamming or the like, the input-output control unit suitably allots the still required copies among the remaining operable image forming units, and the signal output unit is simply required to inspect whether the copying operation is completed and whether the copying operation is still enabled.

On the other hand, regardless whether the input-output unit is connected or not, the instruction for starting the image forming operation and the control on the image signal output are conducted by the signal output unit, thus enabling various system structures without changing the nature of the control and allowing the operator to control the entire system through the signal output unit.

The image forming units are all controlled by the input-output unit, so that the increase or decrease in the number of signal output units or image forming units does not affect the image output unit.

The signal output units and image forming units are controlled by respective identification numbers, allowing easy handling for the operator. Also a display of the identification number given to the signal output unit is convenient for use for the operator.

In case of 1-to-1 connection an image forming unit of an identification number same as that of the signal output unit is always automatically selected unless otherwise instructed, thus facilitating the operation of the operator.

In case of an error in any of the image forming units, it is automatically replaced by another image forming unit and the operator is given a display only if all the image forming units in use develop errors, so that the operator can easily know whether the copying operation is affected by an error.

The operable or inoperable status of each image forming unit is displayed on the operation panel of the input-output unit, thus allowing easy judgement for the operator.

Also in case of obtaining plural copies the number of copies obtained from a single output of image signal is counted by the input-output unit, whereby flexibility is given to the eventual change in the number of images obtained in each image signal output resulting from the change in the number of image forming units used or from errors therein.

In the conventional 1-to-1 connection between the signal output unit and the image forming unit, there is given copy count and display for each copy in the conventional manner, whereby the copy counting and display of the reproduced copies are rendered flexibly adaptable to the status of the image forming units, status of the input-output unit or instructions from the operation unit, thus facilitating system construction and operation.

Also the presence of a mode in which the image forming units are designated by the operator and another mode in which said units are automatically selected by the input-output unit allows flexible modification or expansion of the system according to the situation thereof such as it is accommodated in a room or in a floor or in response to the urgent need of the operator.

Besides the copying operation in the multiple mode can be operated in a similar manner as in the conventional copier, without any complication to the operator.

The sizes of the recording materials available to the system are displayed and shown to the operator in a signal output unit, and the selection of the sizes can be achieved without consideration to the upper or lower cassette position as in the conventional copier.

The identification numbers of the image forming units are displayed to clarify the relationship between the sheet sizes and the image forming units. The image forming units having errors are excluded from the display, whereby the status of said units is made clear.

The display unit is rendered easily operable as it changes the mode of display according to whether the signal output unit is connected with the image forming units through the input-output unit or without said unit.

Also a mode, called "single mode" in the foregoing explanation, in which the signal output unit is connected with a particular image forming unit, enables the operator to use the system in the same manner as in a case where the signal output unit is directly connected with the image forming unit without the input-output unit.

The mode of error display is modified according to the situation of the signal output unit, whereby the operator can flexibly select various methods such as (1) resolving the error after the next copying operation is started, (2) using the system in a different mode, or (3) using the system after resolving the easiest one to resolve, thereby improving the efficiency of use of the entire system.

The mode of using a particular image forming unit has a priority over the mode of using undetermined plural image forming units, so that an interruption can be achieved without complication even when all the image forming units are in operation.

In the present system the image forming units of identification numbers same as those of the signal output units are controlled by said signal output units while the image forming units lacking such corresponding identification numbers are controlled by the multi-input multi-output unit. Thus, in the shut-off function, when all the signal output units are shut off, the image forming units controlled by said input-output unit are also shut off, and, when the shut-off state is terminated in any of the signal output unit said image forming units controlled by the input-output unit are rendered active, whereby the system ensures improved safety and economy without sacrificing the flexibility.

In case any of the image forming units becomes inoperable in the course of a copying operation with plural image forming units, there are provided a mode of automatically correcting the copying operation and another mode of interrupting the copying operation. Consequently the operation can be rendered flexible for example in case of restarting an image reading unit with an automatic original feeder in the sorting mode.

In the foregoing description the present invention has been explained by an embodiment thereof, but the present invention is not imited to such embodiment and is subject to various modifications and variations within the spirit and scope of the appended claims.

TABLE 1

| | TITLE | Code 1st byte | Code 2nd byte |
|---|---|---|---|
| 1 | REQUESTING ENTIRE STATUS | $01_H$ | none |
| 2 | REQUESTING OPERATOR CALL ERROR | $02_H$ | none |
| 3 | REQUESTING SERVICEMAN CALL ERROR | $04_H$ | none |
| 4 | REQUESTING NUMBER OF REQUESTED RESENDINGS | $08_H$ | none |
| 5 | REQUESTING LOWER CASSETTE STATUS | $0B_H$ | none |
| 6 | REQUESTING UPPER CASSETTE STATUS | $0D_H$ | none |
| 7 | REQUESTING APPLICATION STATUS | $0E_H$ | none |
| 8 | REQUESTING PRINTER INFORMATION | $8C_H$ | printer number |
| 9 | REQUESTING NUMBER OF SHEETS FED | $29_H$ | none |

H stands for hexadecimal notation.

TABLE 2
COMMAND ERROR STATUS

| | |
|---|---|
| bit 7 | 1 |
| bit 6 | parity error |
| bit 5 | — |
| bit 4 | — |
| bit 3 | — |
| bit 2 | — |
| bit 1 | — |
| bit 0 | parity bit |

TABLE 3
STATUS 1 (ENTIRE STATUS)

| | |
|---|---|
| bit 7 | 0 |
| bit 6 | PRINT REQUESTED |
| bit 5 | SHEET IN FEEDING |
| bit 4 | PRINT ERROR |
| bit 3 | WAIT CYCLE |
| bit 2 | OFF DUTY |
| bit 1 | CALL ERROR PRESENT |
| bit 0 | PARITY BIT |

TABLE 4
STATUS 2 (OPERATOR CALL ERROR STATUS)

| | |
|---|---|
| bit 7 | 0 |
| bit 6 | TONER ABSENT |
| bit 5 | RECOVERED TONER OVERFLOW |
| bit 4 | PAPER ABSENT |
| bit 3 | SHEET JAMMED |
| bit 2 | ERROR IN SORTER |
| bit 1 | — |
| bit 0 | PARITY BIT |

TABLE 5
STATUS 3 (SERVICEMAN CALL ERROR STATUS)

| | |
|---|---|
| bit 7 | 0 |
| bit 6 | ERROR IN FIXING UNIT |
| bit 5 | ERROR IN BD |
| bit 4 | ERROR IN SCANNER |
| bit 3 | ERROR IN PELTIER |
| bit 2 | ERROR IN DRUM MOTOR |
| bit 1 | NO COUNTER |
| bit 0 | PARITY BIT |

TABLE 6
STATUS 4 (REQUESTED RESENDING NUMBER STATUS)

| | |
|---|---|
| bit 7 | 0 |
| bit 6 | NUMBER OF REQUESTED RESENDINGS |
| bit 5 | NUMBER OF REQUESTED RESENDINGS |
| bit 4 | NUMBER OF REQUESTED RESENDINGS |
| bit 3 | NUMBER OF REQUESTED RESENDINGS |
| bit 2 | NUMBER OF REQUESTED RESENDINGS |
| bit 1 | NUMBER OF REQUESTED RESENDINGS |
| bit 0 | PARITY BIT |

TABLE 7
STATUS 5 (LOWER CASSETTE SHEET SIZE STATUS)

| | |
|---|---|
| bit 7 | 0 |
| bit 6 | SHEET SIZE |
| bit 5 | SHEET SIZE |
| bit 4 | SHEET SIZE |
| bit 3 | SHEET SIZE |
| bit 2 | SHEET SIZE |
| bit 1 | SHEET SIZE |
| bit 0 | PARITY BIT |

TABLE 8
STATUS 6 (UPPER CASSETTE SHEET SIZE STATUS)

| | |
|---|---|
| bit 7 | 0 |
| bit 6 | SHEET SIZE |
| bit 5 | SHEET SIZE |
| bit 4 | SHEET SIZE |
| bit 3 | SHEET SIZE |
| bit 2 | SHEET SIZE |
| bit 1 | SHEET SIZE |
| bit 0 | PARITY BIT |

TABLE 9
STATUS 7 (APPLICATION STATUS)

| | |
|---|---|
| bit 7 | 0 |
| bit 6 | — |
| bit 5 | — |
| bit 4 | — |
| bit 3 | — |
| bit 2 | CONNECTED UNIT PRESENT |
| bit 1 | — |
| bit 0 | PARITY BIT |

TABLE 10
STATUS 8 (PRINTER INFORMATION STATUS)

| | |
|---|---|
| bit 7 | 0 |
| bit 6 | PRINTER READY |
| bit 5 | MY PRINTER |
| bit 4 | UPPER CASSETTE SHEET SIZE bit 1 |
| bit 3 | UPPER CASSETTE SHEET SIZE bit 0 |
| bit 2 | LOWER CASSETTE SHEET SIZE bit 1 |
| bit 1 | LOWER CASSETTE SHEET SIZE bit 0 |
| bit 0 | PARITY BIT |

TABLE 11
STATUS 9 (SHEET FEEDING NUMBER STATUS)

| | |
|---|---|
| bit 7 | COMMAND ERROR |
| bit 6 | FINAL SHEET FEEDING |
| bit 5 | RESENDING REQUESTED |
| bit 4 | NUMBER OF SHEET FEEDINGS bit 3 |
| bit 3 | NUMBER OF SHEET FEEDINGS bit 2 |
| bit 2 | NUMBER OF SHEET FEEDINGS bit 1 |
| bit 1 | NUMBER OF SHEET FEEDINGS bit 0 |
| bit 0 | PARITY BIT |

TABLE 12

| TITLE | Code 1st byte | Code 2nd byte |
|---|---|---|
| 1 COPY START | $49_H$ | none |
| 2 PRINTER STOP | $4A_H$ | none |
| 3 SHEET FEED FROM LOWER CASSETTE | $51_H$ | none |
| 4 SHEET FEED FROM UPPER CASSETTE | $52_H$ | none |
| 5 INSTRUCT NUMBER OF COPIES | $91_H$ | copy number |
| 6 INSTRUCT MULTIPLE MODE | $61_H$ | printer number |
| 7 INSTRUCT SINGLE MODE | $62_H$ | none |
| 8 INSTRUCT SHEET SIZE | $8F_H$ | sheet size |
| 9 SHUT-OFF START | $45_H$ | none |
| 10 SHUT-OFF STOP | $46_H$ | none |
| 11 INSTRUCT SORTING MODE | $92_H$ | none |

TABLE 13

| (A) Reader | (B) Communication | (C) Multi-input multi-output unit | (D) Communication | (E) Printer |
|---|---|---|---|---|
| (1) Select sheet size | | | | |
| (2) Select printer | | | | |
| (3) Set copy number | | | | |
| (4) Actuate copy start key | (1) Instruct sheet size and printer number | (1) Check printers with required sheet size | | |
| | (2) Instruct copy number | (2) Calculate number of required printers | | |
| | | (3) Designate cassette in the printers of required number | (1) Select cassette position | |
| | (3) Copy start | (4) Copy start signal given to the printers of required number | (2) Copy start | (1) Start prerotation |
| | (4) Image signal receivable | (5) Wait until all the printers reach the image signal receivable state | (3) Image signal receivable | |
| (5) Start original reading | (5) Image signals | (6) Simultaneous supply of image signals to the printers of required number | (4) Image signals | (2) Image forming process |
| (6) Count down copy number | (6) Copy count | (7) Calculate copy number | | |
| | | (8) Check whether copies of preset number are completed | | |
| | (7) Final copy end | (9) If not end, repeat the procedure from the check for the image signal receivable state | | |
| | (8) Printer stop | (10) Stop all the printers in use | (5) Printer stop | (3) Stop printers |

What is claimed is:

1. An image processing system comprising:
generating means for generating digital image signals;
plural image forming means for image formation in response to said digital image signals; and
transmission means for transmitting the digital image signals generated by said generating means to said plural image forming means,
wherein said transmission means is provided with plural synchronizing means each for providing synchronization of transmission of said digital image signals to an associated one of said plural image forming means so as to achieve simultaneous image formation by said plural image forming means in response to the same digital image signals, and
wherein each of said synchronizing means comprises memory means for storing the digital image signals generated by said generating means.

2. An image processing system according to claim 1, wherein each of said synchronizing means is adapted to receive synchronizing signals relating to the image formation from the associated one of said plural image forming means and to synchronize the transmission of said digital image signals to the associated one of said plural image forming means in response to said synchronizing signals.

3. An image processing system according to claim 1, wherein said generating means comprises reading means for photoelectrically reading an original document.

4. An image processing system according to claim 1, wherein said transmission means is operable to select an image forming means for use in image formation from among said plural image forming means.

5. An image processing system comprising:
generating means for generating digital image signals in accordance with synchronizing signals;
at least one image forming means connected with said generating means and adapted for image formation in response to said digital image signals; and
recognizing means for recognizing a number of said image forming means to be connected with said generating means;
wherein said generating means changes the synchronizing signals employed in the generation of the digital image signals in accordance with the number recognized by said recognizing means.

6. An image processing system according to claim 5, wherein said recognizing means is adapted to recognize whether the number of the connected image forming means is one or more than one.

7. An image processing system according to claim 5, wherein said generating means is adapted to generate the digital image signals in response either to a first synchronizing signal supplied from the connected image forming means, or to a second sychronizing signal generated in said generating means.

8. An image processing system according to claim 5, wherein said generating means comprises reading means for photoelectrically reading an original document.

9. An image processing system comprising:
generating means for generating digital image signals;
plural image forming means for image formation on a recording material in response to the digital image signals from said generating means, wherein said plural image forming means is equipped with the recording materials of plural sizes;
designating means for designating the size of the recording material to be employed in the image formation; and
means for selecting the image forming means to be employed from said plural image forming means, according to the size designated by said designating means.

10. An image processing system according to claim 9, wherein said designating means is provided in said generating means.

11. An image processing system according to claim 9, further comprising display means for displaying the sizes of the recording materials contained in said plural image forming means.

12. An image processing system according to claim 9, wherein said plural image forming means are adapted to execute simultaneous image formations in response to the same digital image signals.

13. An image processing system according to claim 9, wherein said generating means comprises reading means for photoelectrically reading an original document.

14. An image processing system comprising:
generating means for generating digital image signals;
plural image forming means each adapted to form an image on various sizes of recording material in response to the digital image signals; and
transmission means for receiving said digital image signals from said generating means and selectively transmitting the digital image signals to at least one of said plural image forming means;
wherein said generating means outputs size information regarding a size of a recording material on which an image is to be formed to said transmission means, and said transmission means selects at least one of the plural image forming means in accordance with the size information outputted by said generating means.

15. An image processing system according to claim 14, wherein said generating means comprises reading means for photoelectrically reading an original document.

16. An image processing system according to claim 14, wherein said generating means is also operable to output information concerning the number of times of image formation.

17. An image processing system according to claim 13, wherein said generating means includes manual operable means for setting a desired size of the recording material.

18. An image processing system according to claim 14, wherein said plural image forming means are adapted to execute simultaneous image formations in response to the same digital image signals.

19. An image processing system comprising:
generating means for generating digital image signals;
plural image forming means for selective image formation in response to the digital image signals from said generating means;
displaying means for indicating disabled state of the image forming means; and
control means adapted, in case one of the image forming means becomes disabled in the course of an image formation and said image formation can be achieved by another of the image forming means, to cause said another image forming means to execute said image formation;
wherein said display means does not indicate the disabled state of the image forming means in case the image formation can be executed by another image forming means.

20. An image processing system according to claim 19, wherein said display means is adapted to display the disabled state in case the disabled image forming means cannot be replaced by another image forming means.

21. An image processing system according to claim 19, wherein said generating means comprises reading means for photoelectrically reading an original document.

22. An image processing system according to claim 19, wherein said plural image forming means are adapted to execute simultaneous image formations in response to the same digital image signals.

23. An image processing system comprising:
generating means for generating digital image signals;
plural image forming means for image formation on a recording material in response to the digital image signals; and
display means provided in said generating means and adapted to display all the size information on said recording materials charged in said plural image forming means.

24. An image processing system according to claim 23, further comprising selecting means for selecting the image forming means to be employed according to the size information displayed in said display means.

25. An image processing system according to claim 23, wherein said plural image forming means are adapted to execute simultaneous image formations in response to the same digital image signals.

26. An image processing system according to claim 23, wherein said generating means is composed of reading means for photoelectrically reading an original document.

27. An image processing system according to claim 26, further comprising means for selecting an image forming means for use in image formation among said plural image forming means.

28. An image processing system comprising:
generating means for generating digital image signals; and
plural image forming means for simultaneous image formation in response to the same digital image signals;
wherein provided, in case at least one of the plural image forming means in the course of simultaneous image formation becomes disabled, are a first mode in which the image formation is executed by other image forming means and a second mode in which the entire image forming operation is interrupted.

29. An image processing system according to claim 28, further comprising selecting means for selecting either of said first and second modes.

30. An image processing system according to claim 29, wherein said generating means comprises reading means for photoelectrically reading an original document.

* * * * *

UNITED STATES PATENT AND TRADEMARK OFFICE
CERTIFICATE OF CORRECTION

PATENT NO. : 4,791,492

DATED : Decmeber 13, 1988

INVENTOR(S) : NAO NAGASHIMA ET AL.          Page 1 of 4

It is certified that error appears in the above-identified patent and that said Letters Patent is hereby corrected as shown below:

AT [56] REFERENCES CITED

U.S. Patent Documents, "4,110,794 3/1978" should read --4,110,794 8/1978--.

U.S. Patent Documents, "4,491,873 1/1988" should read --4,491,873 1/1985--.

AT [57] ABSTRACT

Line 2, "is" should read --are--.

COLUMN 3

Lines 49-50, "as long is not indicated" should read --is not indicated as long--.

Line 64, "aspect object" should read --aspect--.

COLUMN 5

Line 40, "2A and 2B" should read --2(a) and 2(b)--.

Line 49, "2A." should read --2(a).--.

COLUMN 6

Line 26, "2A and 2B" should read --2(a) and 2(b)--.

UNITED STATES PATENT AND TRADEMARK OFFICE
CERTIFICATE OF CORRECTION

PATENT NO. : 4,791,492
DATED : Decmeber 13, 1988
INVENTOR(S) : NAO NAGASHIMA ET AL.          Page 2 of 4

It is certified that error appears in the above-identified patent and that said Letters Patent is hereby corrected as shown below:

COLUMN 7

Line 3, "2B," should read --2(b),--.
    Line 47, "similar as" should read --similar manner as--.
    Line 57, "board" should read --boards--.
    Line 61, "2A)," should read --2(a)),--.
    Line 63, "printers 121-128." should read
           --printers 111-118.--.

COLUMN 9

Lines 8-9, "__173,...__, 177, 178, 171, __...,__"
          should read --173,...,177,178,171,...,--.

COLUMN 10

Line 27, "2B," should read --2(b),--.

COLUMN 12

Line 66, "range" should read --range of--.

COLUMN 14

Line 20, "size," should read --size is actuated,--.
    Line 31, "In" should read --If--.

UNITED STATES PATENT AND TRADEMARK OFFICE
CERTIFICATE OF CORRECTION

PATENT NO. : 4,791,492

DATED : Decmeber 13, 1988

INVENTOR(S) : NAO NAGASHIMA ET AL.

It is certified that error appears in the above-identified patent and that said Letters Patent is hereby corrected as shown below:

COLUMN 15

Line 46, "actiation" should read --activation--.
    Line 63, "FIG." should read --Tab.--.

COLUMN 17

Line 11, "printer the" should read --printer indicates the--.
    Line 61, "information" should read --information,--.

COLUMN 22

Line 31, "rails," should read --fails,--.

COLUMN 25

Line 41, "assuemd" should read --assumed--.

COLUMN 26

Line 10, "continued" should read --continues--.
    Line 49, "MIMO" should read --MIMOU--.

COLUMN 28

Lines 11-12, "rending" should read --researching--.

COLUMN 32

Line 31, "unit" should read --units--.
    Line 45, "imited" should read --limited--.

UNITED STATES PATENT AND TRADEMARK OFFICE
CERTIFICATE OF CORRECTION

PATENT NO. : 4,791,492

DATED : Decmeber 13, 1988

INVENTOR(S) : NAO NAGASHIMA ET AL.      Page 4 of 4

It is certified that error appears in the above-identified patent and that said Letters Patent is hereby corrected as shown below:

COLUMN 37

Line 57, "13," should read --14,--.

COLUMN 38

Line 1, "displaying" should read --display--.
    Line 65, "29," should read --28,--.

Signed and Sealed this

Eleventh Day of September, 1990

Attest:

HARRY F. MANBECK, JR.

Attesting Officer    Commissioner of Patents and Trademarks